United States Patent [19]

Suda et al.

[11] 4,290,107
[45] Sep. 15, 1981

[54] ELECTRONIC FUEL CONTROL SYSTEM FOR AN INTERNAL COMBUSTION ENGINE

[75] Inventors: Seiji Suda, Mito; Taiji Hasegawa, Minato; Yasunori Mouri, Katsuta; Toshio Furuhashi, Tomobe, all of Japan

[73] Assignee: Hitachi, Ltd., Tokyo, Japan

[21] Appl. No.: 42,495

[22] Filed: May 25, 1979

[30] Foreign Application Priority Data

Jun. 2, 1978 [JP] Japan .................. 53-66568

[51] Int. Cl.³ .............. F02B 3/00; F02D 35/00
[52] U.S. Cl. .................. 364/431; 123/440; 123/480; 123/489; 123/589
[58] Field of Search ........ 364/431, 442; 60/276, 60/285; 123/440, 480, 486, 489, 589

[56] References Cited

U.S. PATENT DOCUMENTS

| | | | |
|---|---|---|---|
| 3,948,081 | 4/1976 | Wessel et al. | 60/276 X |
| 3,969,614 | 7/1976 | Moyer et al. | 364/431 |
| 4,138,979 | 2/1979 | Taplin | 123/489 X |
| 4,167,163 | 9/1979 | Möder | 123/440 |
| 4,170,967 | 10/1979 | Wessel et al. | 123/489 |
| 4,173,957 | 11/1979 | Hattori et al. | 123/589 X |
| 4,174,689 | 11/1979 | Hosaka | 123/440 |
| 4,176,629 | 12/1979 | Kawai et al. | 123/486 |
| 4,178,793 | 12/1979 | Bremer et al. | 123/489 |
| 4,182,292 | 1/1980 | Anzai et al. | 123/440 |
| 4,183,335 | 1/1980 | Asano et al. | 123/489 |
| 4,200,064 | 4/1980 | Engele | 123/480 |
| 4,235,204 | 11/1980 | Rice | 123/440 |

FOREIGN PATENT DOCUMENTS

2845043  4/1979  Fed. Rep. of Germany ...... 123/32 EA

OTHER PUBLICATIONS

McObyn: Microprocessors-Automotive Applications, John Wiley, 1976, pp. 158-161.

Primary Examiner—Felix D. Gruber
Attorney, Agent, or Firm—Craig and Antonelli

[57] ABSTRACT

A signal corresponding to the oxygen concentration in exhaust gas as detected by an $O_2$ sensor is applied to a control logic circuit after analog conversion. The duty ratio of a pulse signal for keeping the optimum air-fuel ratio corresponding to a running state of an automobile is calculated by the use of the detection signal and in accordance with a program stored in a ROM in advance. The control pulse having the duty ratio is used for the switching control of a solenoid valve for regulating the air-fuel ratio of a mixture.

11 Claims, 30 Drawing Figures

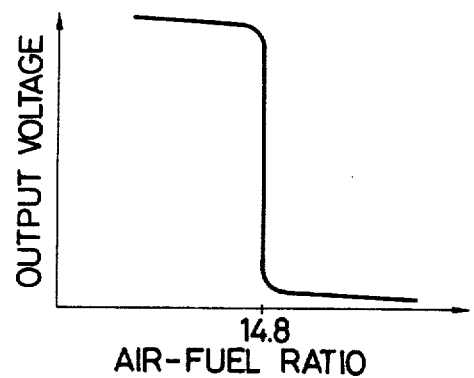
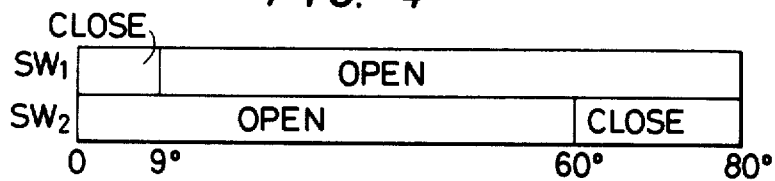
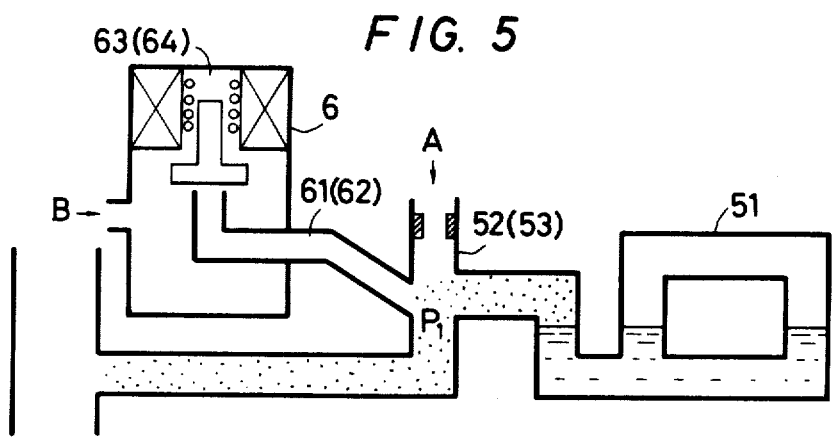

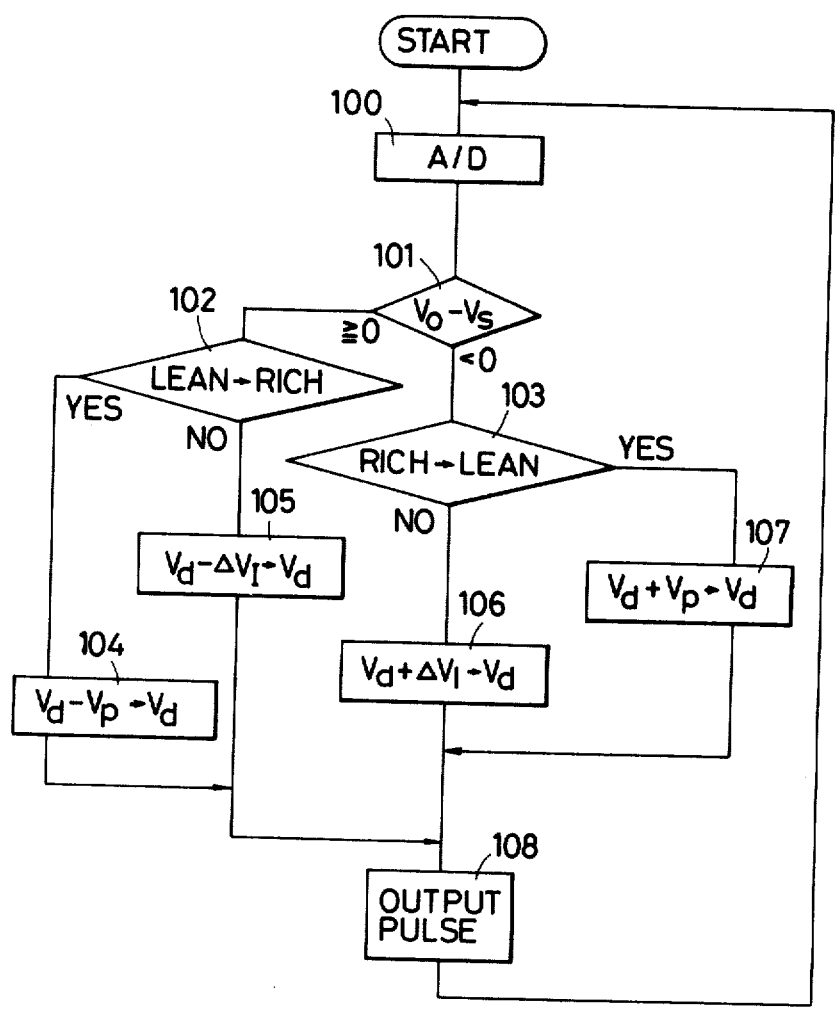

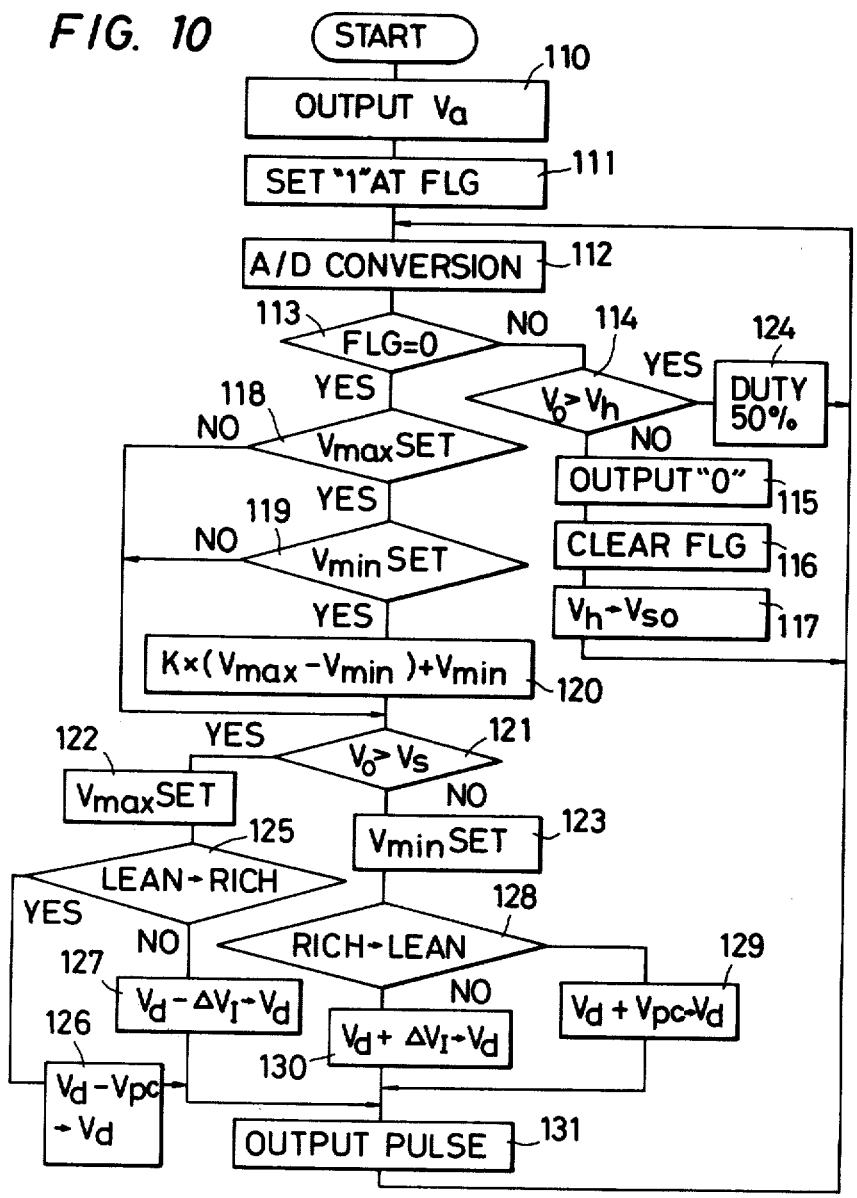

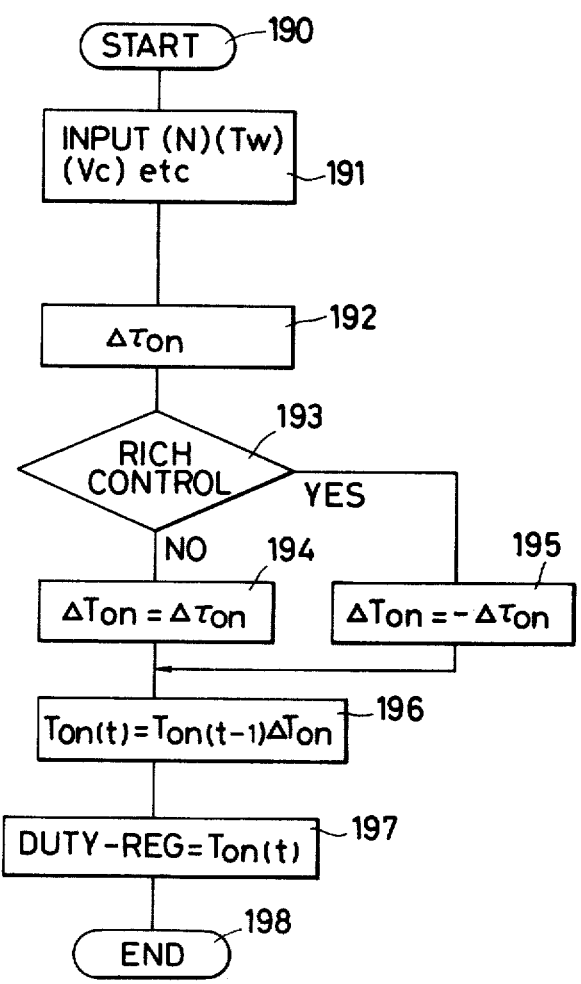

ELECTRONIC FUEL CONTROL SYSTEM FOR AN INTERNAL COMBUSTION ENGINE

BACKGROUND OF THE INVENTION

This invention relates to an electronic fuel control system for an internal combustion engine. More particularly, it relates to a system for controlling a carburetor so that the air-fuel ratio of a mixture consisting of fuel and air to be supplied to the internal combustion engine of, for example, an automobile may always become the optimum value under various operating conditions.

An objective in present-day automotive engine efforts is to reduce pollutants in the exhaust gas of an automobile. Noxious components in the exhaust gas include carbon monoxide (CO), hydrocarbons (HC) and nitrogen oxides ($NO_x$). According to an oxidizing catalyst system which has hitherto been well known, CO and HC can be converted into innoxious carbon dioxide ($CO_2$) and water vapor ($H_2O$) by the aid of a catalyst. $NO_x$, however, must be reduced by improvements in the engine.

In contrast, according to a ternary catalyst system, the oxidation of CO and HC and the reduction of $NO_x$ are simultaneously executed, and the three noxious components in the exhaust gas are converted into innoxious $CO_2$, $H_2O$ and $N_2$. When cleansing the exhaust gas with the ternary catalyst, the cleansing characteristic varies greatly in dependence on the air-fuel ratio of the mixture supplied to a cylinder. When the mixture is lean, that is, when the air-fuel ratio is large, the amount of oxygen ($O_2$) is large even after combustion, and the oxidizing action becomes active and simultaneously the reducing action becomes inactive. Of course, the converse is true when the mixture is rich, that is, when the air-fuel ratio is small. When the oxidation and the reduction balance, that is, when the mixture is of the theoretical air-fuel ratio, the ternary catalyst carries out the cleansing action most effectively.

The "theoretical air-fuel ratio" referred to above represents the weight ratio of air to fuel at the time when the fuel performs perfect combustion theoretically, and usually it is approximately 14.8. When employing the ternary catalyst system, accordingly, it is necessary that the ratio between the air and fuel of the mixture be held at the theoretical air-fuel ratio during ordinary running of the automobile. In an attempt to meet this demand, there has theretofore been known a system wherein the exhaust gas concentration is detected and wherein the air-fuel ratio is feedback-controlled on the basis of the detection signal. In this control system, a sensor for detecting the exhaust gas concentration is disposed in the exhaust manifold of the engine, and a solenoid mounted on the carburetor is actuated by the output signal of the sensor. Upon the actuation of the solenoid, the air-fuel ratio of the mixture to be supplied to the cylinder of the engine is controlled.

This prior-art control system, however, has several problems. The first problem is attributed to deviations and temporal or time varying changes in the characteristics of elements and units used for the control, such as deviations and temporal changes in the various characteristics of the exhaust gas sensor and deviations in the performance of the carburetor. Even when the operating conditions of the automobile do not fluctuate, the air-fuel ratio of the mixture departs from the theoretical air-fuel ratio because the characteristics of the various devices constituting the control system include deviations and fluctuate with time, as described above. As a result, it becomes difficult to maximize the action of purifying the exhaust gas.

The second problem is caused by the characteristics themselves of the sensors and units constituting the control system. For example, regarding the sensor which is used for detecting the exhaust gas concentration, the internal resistance is greatly dependent upon the temperature, and no output voltage is provided at low temperatures, so that the air-fuel ratio control cannot be effected until the sensor is warmed up after the starting of the engine. A time delay is inevitably involved between the control signal of the portion for controlling the air-fuel ratio of the mixture to be supplied from the carburetor to the engine and the output signal provided from the portion for detecting the exhaust gas concentration, so that the responsiveness and the control precision in the case of sudden changes in the operating conditions are unsatisfactory. For example, where the acceleration state turns into the deceleration or light load state, the air-fuel ratio of the mixture becomes overrich during the transient period.

The third problem is due to fluctuations in the various operating conditions of the automobile. It is extremely difficult to control the air-fuel ratio to the optimum in correspondence with fluctuations in the rotational frequency and load of the engine, the temperature of the cooling water, the opening degree of the throttle valve, etc.

SUMMARY OF THE INVENTION

A principal object of this invention is to provide an electronic fuel control system for an internal combustion engine which can always maintain the optimum air-fuel ratio irrespective of deviations and temporal changes in the characteristics of elements and units constituting a fuel control system and irrespective of the various operating conditions of an automobile as well as changes in the operating conditions.

In order to accomplish the object, this invention consists in a system comprising at least one sensor for detecting the exhaust gas concentration, the opening degree of a throttle valve, the rotational frequency of the engine, the temperature of cooling water, or the like, and a control unit for controlling the air-fuel ratio of a mixture in response to the output of the sensor. The control unit includes a microprocessor which processes data, and a memory which stores programs and data therein. The air-fuel ratio corresponding to the operating conditions of the automobile is calculated in accordance with a predetermined control program, and a solenoid for varying the air-fuel ratio of the mixture is controlled on the basis of the calculated result.

According to an embodiment of this invention, a signal corresponding to the oxygen concentration in the exhaust gas as detected by an $O_2$ sensor is subjected to analog-digital conversion and then supplied to a control logic circuit, the duty ratio of a pulse signal for maintaining the optimum air-fuel ratio corresponding to the running state of the automobile is calculated by using the detection signal and in accordance with a program stored in a ROM in advance, and the opening and closure of a solenoid valve for regulating the air-fuel ratio of the mixture is controlled with the control pulse having the calculated duty ratio.

According to another embodiment of this invention, the corresponding relations between the quantities of inflowing air and the air-fuel ratios of the fuel mixture to be supplied to the engine are stored in a ROM in advance, signals of a sensor for the rotational angle of the engine and a sensor for the negative pressure of a suction manifold are received to calculate the quantity of inflow air of the suction manifold, the air-fuel ratio corresponding to the calculated quantity of inflow air is obtained from the ROM, and the opening and closure of a solenoid valve is controlled so as to keep the particular air-fuel ratio constant. In this case, a temporal change in the characteristic of a carburetor can be corrected with the output of an $O_2$ sensor as may be needed.

According to still another embodiment of this invention, the exhaust gas recirculation rate and the ignition timing can be controlled simultaneously with the air-fuel ratio control on the basis of the air-fuel ratio obtained as described above and the output of the sensor for the engine revolution angle.

Other objects, effects and features of this invention will be more clearly understood from the following description of embodiments of this invention taken with reference to the drawings.

BRIEF DESCRIPTION OF THE DRAWINGS

FIG. 3 is a graph showing the characteristic of an $O_2$ sensor.

FIG. 4 is a diagram for explaining the operation of a sensor which detects the opening degree of a throttle valve.

FIG. 5 is a view showing the structure of the solenoid valve.

FIG. 7 is a flow chart for explaining the fundamental operation of the control system of this invention.

FIG. 10 is a flow chart for explaining the control at the time of the starting of an engine.

FIGS. 11A and 11B are flow charts for explaining the control responsive to the load state of the engine.

FIGS. 15 and 16 are a flow chart and a waveform diagram, respectively, for explaining the control at the fault of the $O_2$ sensor or the like.

FIG. 17A is a graph showing the fluctuation of the air-fuel ratio versus the quantity of suction air in a carburetor, while

PREFERRED EMBODIMENTS OF THE INVENTION

Figure 1:
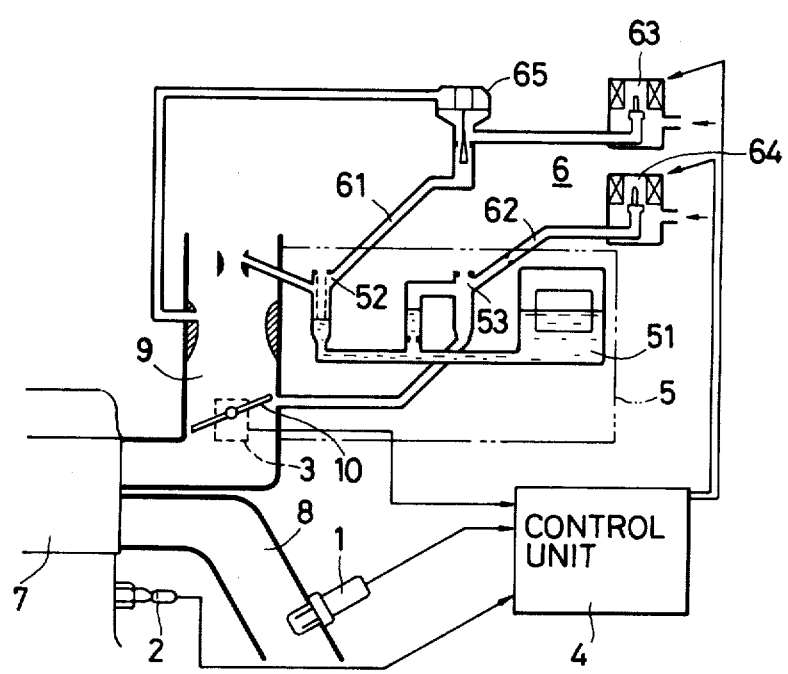
FIG. 1 is a schematic view of a fuel feed system and an exhaust system for explaining the control system of this invention.
Figure 2A:
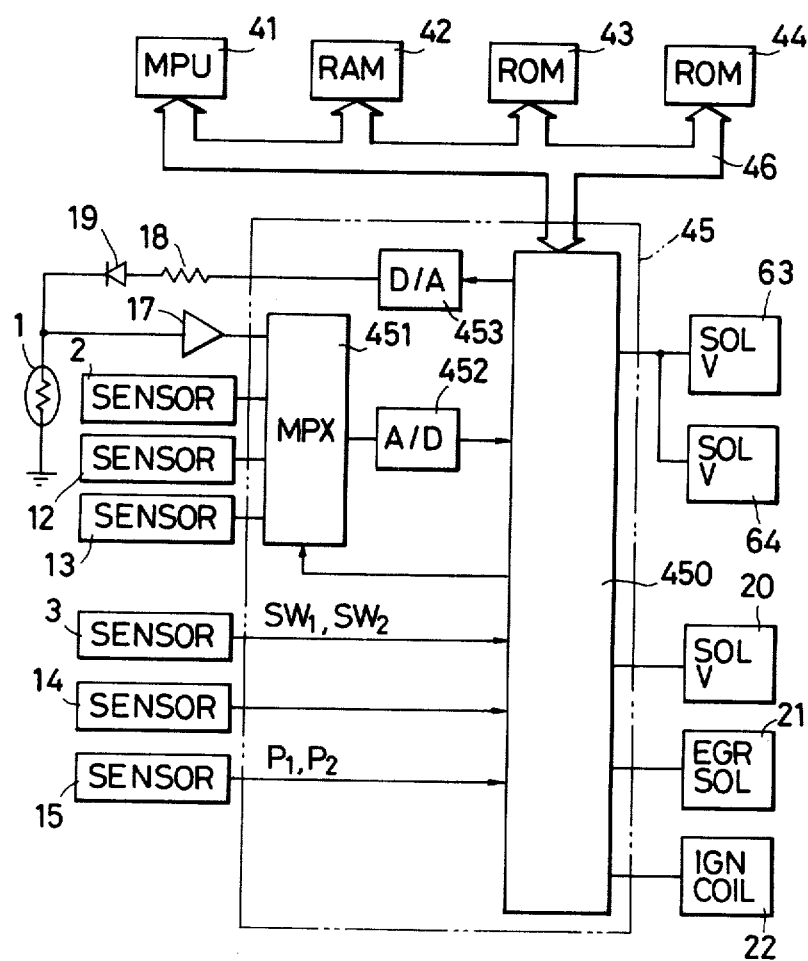
FIG. 2A is a block diagram showing the construction of a control unit in this invention.
Figure 2B:
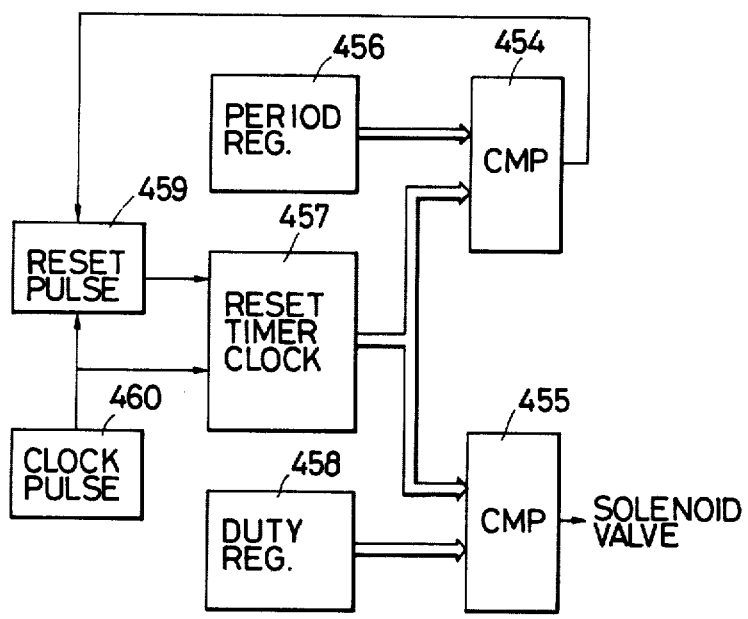
FIG. 2B is a block diagram showing a part of the arrangement of a logic control circuit in the control unit.

An embodiment of this invention will be described with reference to FIG. 1 showing a conceptual diagram of an air-fuel-ratio feedback system and FIGS. 2A and 2B showing block diagrams of a control unit. The air-fuel-ratio feedback system is constructed of sensors such as an $O_2$ sensor 1, a water temperature sensor 2 and a throttle valve opening sensor 3; a control unit 4; an electronically controlled carburetor 5; an adjuster for bleeding air off 6; etc. Hereunder, the respective constituents will be explained in detail.

Sensors

The $O_2$ sensor 1 for detecting the exhaust gas concentration is disposed in the exhaust manifold 8 of engine 7. As is well known, this $O_2$ sensor has a structure in which the inner surface and outer surface of a zirconia tube are coated with thin layers of platinum and which generates an electromotive force between the inner side (atmospheric air side) and outer side (exhaust gas side) of the zirconia tube. The magnitude of the electromotive force developed is determined depending upon the ratio of oxygen concentration in the atmospheric air and the exhaust gas. In general, the $O_2$ sensor has an electromotive force characteristic as illustrated in FIG. 3. That is, the electromotive force changes suddenly at the ratio of the oxygen concentration in the exhaust gas at the time when the mixture is burnt at the theoretical air-fuel ratio. The electromotive force becomes high on the overrich mixture side, and low on the lean mixture side. The exhaust manifold 8 is provided with a catalytic converter (not shown) which employs a ternary catalyst. The air-fuel ratio at which the ternary catalyst acts effectively is in agreement with the air-fuel ratio at which the electromotive force of the $O_2$ sensor changes suddenly. The output signal of the $O_2$ sensor is applied to the control unit 4.

On the other hand, an intake manifold 9 is provided with a throttle valve 10, the opening degree of which is detected by the sensor 3 including two switches $SW_1$ and $SW_2$. As illustrated in FIG. 4, the switch $SW_1$ operates so as to close when the degree of opening of the throttle valve 10 is not greater than 9° and to open when it is greater than the value. The switch $SW_2$ operates so as to close when the degree of opening of the throttle valve 10 is not less than 60° and to open when it is less than the value. From the operations of the two switches, accordingly, it can be sensed whether the opening degree of the throttle valve 10 is at most 9°, between 9° and 60°, or at least 60°. Usually, a value of at most 9° in the opening degree of the throttle valve 10 indicates a deceleration or idling state, a value between 9° and 60° indicates an acceleration or steady load state, and a value of at least 60° indicates a rapid acceleration or high load state.

The water temperature sensor 2 is disposed in order to detect the temperature $T_w$ of the cooling water of the engine. As further sensors, there are disposed a pressure sensor 12 for detecting the negative pressure of a suction pipe, a temperature sensor 13 for detecting the suction temperature, a starter switch 14, and a sensor 15 for detecting the rotational angle of the crankshaft. However, none of the sensors 12, 13, 14 and 15 are shown in FIG. 1.

The engine revolution angle-sensor 15 ordinarily generates two types of pulses $P_1$ and $P_2$. One pulse $P_1$ is generated each time the engine crankshaft revolves a predetermined angle, while that number of pulses $P_2$ which corresponds to the number of cylinders is generated each time the engine effects one revolution. The revolution speed of the engine is known by counting the number of pulses $P_1$ generated within a predetermined time or by measuring the time interval between two adjacent pulses $P_2$.

All the outputs of these sensors are applied to the control unit 4.

Carburetor and Adjuster for Air Bleed-off

The carburetor 5 is constructed of a float chamber 51, a main air bleed-off valve 52 and a slow air bleed-off valve 53. The main air bleed-off valve 52 and the slow air bleed-off valve 53 of the carburetor 5 are respectively connected with a main solenoid valve 63 and a slow solenoid valve 64 through correcting air bleed lines 61 and 62. The quantities of air to be drawn in through the correcting air bleed lines 61 and 62 are respectively controlled by the main solenoid valve 63 and the slow solenoid valve 64 which are operated by command signals of the control unit 4. Thus, the air-fuel ratio is adjusted. A variable air bleed-off valve 65 disposed in the main channel senses a Venturi negative pressure, and varies the passage area of the correcting air bleed-off in dependence on the quantity of suction air of the engine. Thus, it is used for making the correction range of air-fuel ratios constant.

FIG. 5 shows the structure of the solenoid valve. Both the main channel and the slow channel have the same structure. When the solenoid valve 63 (64) is closed as shown, only a part A communicates with the air bleed-off valve 52 (53), so that the negative pressure $P_1$ increases to intensify the force for drawing in fuel. Therefore, the air-fuel ratio of the mixture becomes rich. In contrast, when the solenoid valve 63 (64) is open, the correcting air bleed-off valve 61 (62) communicates with the atmospheric air through a part B, so that the negative pressure $P_1$ decreases to weaken the force for drawing in fuel. Therefore, the air-fuel ratio becomes lean. The openings A and B are set so that the mixture may become richer than the theoretical air-fuel ratio when the solenoid valve 63 (64) is closed and that it may become leaner than the theoretical air-fuel ratio when the valve is open. Accordingly, the mixture can be adjusted to be in the vicinity of the theoretical air-fuel ratio by controlling the periods of time during which the solenoid valve 63 (64) is open and closed.

Control Unit

The control unit 4 is constructed of a microprocessor 41 (hereinbelow, abbreviated to "MPU") which executes digital arithmetic processing operations, a memory 42 (hereinbelow, abbreviated to "RAM") which is capable of readout and rewrite and which serves to temporarily store data, a read only memory 43 (hereinbelow, abbreviated to "ROM 43") for storing control programs and fixed data, a read only memory 44 (hereinbelow, abbreviated to "ROM 44") for storing data indicative of the characteristic of the carburetor, an input/output unit 45 (hereinbelow, abbreviated to "I/O unit", etc. The I/O unit 45 transfers to the MPU 41 information on the running conditions of the engine detected by the sensors, and delivers control signals to the main solenoid valve 63, the slow solenoid valve 64 etc. on the basis of the results of the arithmetic processings of the MPU 41. The MPU 41, RAM 42, ROM 43, ROM 44 and I/O unit 45 are interconnected by a bus 46 which consists of an address bus, a data bus and a control bus. The MPU 41 executes arithmetic processing operation in accordance with the program stored in the ROM 43 and by using the input data from the I/O unit 45.

This I/O unit 45 will be described more in detail. The information representative of the operating conditions of the engine includes analog information and digital information. For example, the output of the $O_2$ sensor 1, the output voltage of the pressure sensor 12 for detecting the negative pressure of the suction pipe, the output of the sensor 2 for detecting the cooling water temperature, and the output of the sensor 13 for detecting the suction air temperature are analog signals. On the other hand, the output of the sensor 14 for detecting the "on" or "off" of the starting switch, etc. is in the form of digital signals. The outputs of the sensors represented by analog signals are applied to a multiplexer 451. Upon an instruction from the MPU 41, the multiplexer 451 selects one of the plurality of analog inputs. The output of the multiplexer 451 is converted by an analog-digital converter (abbreviated to "A/D converter") 452 into a digital signal, which is stored in a register (not shown) of a control logic circuit 450. The MPU 41 fetches the stored content of the register at a suitable timing, and if necessary, it makes access to a certain address of the RAM 42 and stores the information therein. Upon completion of the fetch of the information from one sensor, the multiplexer 451 selects the output of another sensor on the basis of an instruction of the MPU 41. Likewise to the above, the analog quantity is converted into a digital quantity, which is stored in the RAM 42. The output of the $O_2$ sensor 1 is applied to the multiplexer 451 through a buffer amplifier 17. On the other hand, a signal from the control logic circuit 450 is applied to the $O_2$ sensor through a digital-analog converter (abbreviated to "D/A converter") 453. The D/A converter 453, a resistor 18 and a diode 19 constitute a circuit for supplying current to the $O_2$ sensor 1.

The control logic circuit 450 has a circuit shown in FIG. 2B in order to form the control pulses which are supplied to the solenoid valves 63 and 64. Referring to the figure, data representative of the period of the control pulse $V_p$ to be supplied to the solenoid valves 63 and 64 are set in a register 456. A register 458 stores therein data representative of the duty ratio of the control pulse $V_p$, in other words, data representative of the period of "on" of the control pulse $V_p$. A timer 457 has the function of counting output pulses of a pulse generator 460 which generates the clock pulses of fixed time intervals, and clearing its count value when a reset pulse is received. A comparator 454 compares the content PERIOD of the register 456 and the content TIMER of the timer 457. It provides logic "1" at PERIOD > TIMER, and provides logic "0" at PERIOD≦TIMER. A comparator 455 similarly compares the content DUTY of the register 458 and the content TIMER of the timer 457. It provides logic "1" (i.e., "on" signal) at DUTY>TIMER, and provides logic "0" (i.e., "off" signal) at DUTY≦TIMER. The output pulse of the comparator 455 is supplied to the solenoid valves 63 and 64 for controlling the air-fuel ratio of the mixture. On the other hand, a reset pulse generator 459 generates the reset pulse in synchronism with the output pulse of the clock pulse generator 460 when the contents of the register 456 and the timer 457 have coincided. This reset pulse is used for clearing the count value of the timer 457.

Figure 2C:
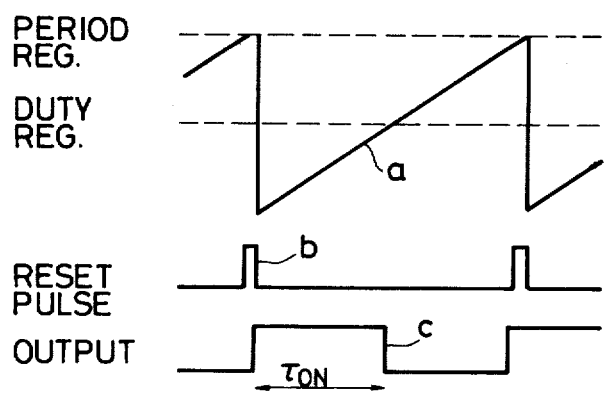
FIG. 2C is a waveform diagram for explaining the operation of the circuit in FIG. 2B.

As illustrated at a in FIG. 2C, the output of the timer 457 rises with the arrival of the clock pulse. When it has become equal to the data PERIOD stored in the register 456, the reset pulse b is generated by the output of the comparator 454 and the content of the timer is cleared. Meanwhile, the comparator 455 compares the output a of the timer 457 and the data DUTY stored in the register 458 and provides the "on" signal during the time during which DUTY>TIMER. Therefore, the output of the comparator 455 becomes a waveform as indicated at c. As is apparent from the above description, the duty ratio of the control pulse can be changed as desired through the data set in the register 458.

The control pulse formed by the control logic circuit 450 is applied to the solenoid valves 63 and 64 in order to control the air-fuel ratio of the mixture which is supplied from the carburetor. If necessary, the control logic circuit 450 forms a control pulse for a solenoid valve 20 which regulates the air flow rate of a bypass passage (not shown) for the quantity of inflowing air of the suction manifold 9, a control pulse for an EGR solenoid valve 21 which controls the exhaust circulation rate, and a pulse to be impressed on an ignition coil 22.

Now, the fundamental operations of the control system according to this invention will be described.

Figure 6A:
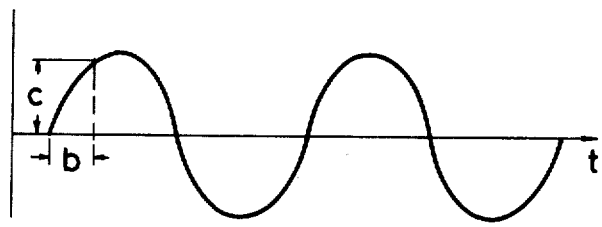
FIGS. 6A to 6D are waveform diagrams for explaining the fundamental operation of the control system of this invention.
Figure 6B:
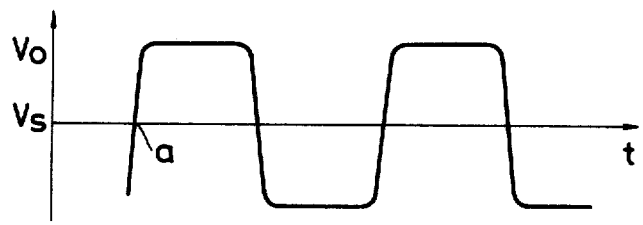
Figure 6C:
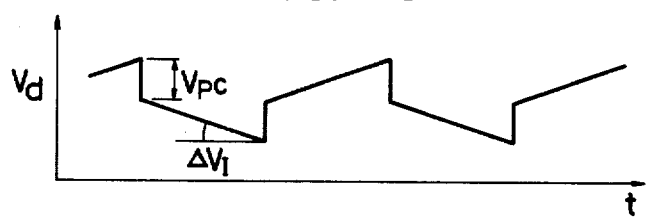
Figure 6D:
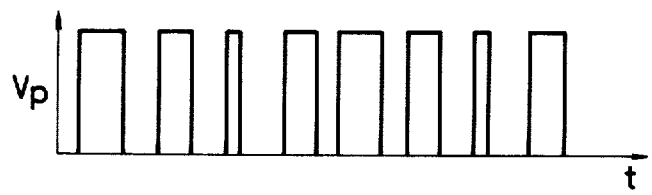

A time delay as illustrated in FIGS. 6A to 6D between the change of the air-fuel ratio of the mixture which is supplied from the carburetor 5 and the detection signal which is actually detected by the $O_2$ sensor 1. More specifically, when the air-fuel ratio of the mixture of the carburetor has changed as shown in FIG. 6A, the output of the $O_2$ sensor 1 changes as shown in FIG. 6B. The output of the $O_2$ sensor 1 indicates that the theoretical air-fuel ratio has been passed at a point of time a. At this time, however, the air-fuel ratio of the mixture which is supplied from the carburetor 5 is already overrich by an amount c. The time delay b between the variation curves in FIGS. 6A and 6B is inevitable because it is the period of time which is taken for the supplied fuel to enter the cylinder 7 through the suction manifold 9 and to be burnt and emitted. This time delay b varies extensively depending upon the operating conditions. Accordingly, in order to decrease to the utmost the adverse influence to be exerted on the control system by the time delay b, and to achieve a control of quick response, an air-fuel-ratio control signal d as shown in FIG. 6C is employed. More specifically, a preset reference voltage $V_s$ and the output voltage $V_o$ of the $O_2$ sensor are compared. When $V_o > V_s$, it is decided that the mixture is rich beyond the theoretical air-fuel ratio, and the air-fuel ratio is made smaller with the control signal. In this case, when it has been detected that $V_o > V_s$, the actual air-fuel ratio of the mixture already overshoots the theoretical air-fuel ratio by an amount c. In order to rapidly bring the air-fuel ratio close to the theoretical value, accordingly, the control signal is changed in a stepped shape by $V_{pc}$. The stepped variation $V_{pc}$ is called the "proportional component". Thereafter, the control signal is varied so as to decrease at a fixed rate $\Delta V_I$ versus time. This variation $\Delta V_I$ is termed the "integral component". On the other hand, when $V_o < V_s$ has been sensed, the control signal is changed so as to rise in a stepped shaped by $V_{pc}$ and to thereafter increase at the fixed rate $\Delta V_I$. The pulse $V_p$, which has an "on" time proportional to the level of the control signal $V_d$, is generated, and the opening and closure of the solenoid valves 63 and 64 are controlled with the pulse $V_p$.

Such an operation is effected in such a way that a program given by a flow chart as shown in FIG. 7 is stored in the ROM 43 in advance and that it is executed by the use of the MPU 41. In a block 100, the output $V_o$ of the $O_2$ sensor 1 is subjected to A/D conversion, to obtain a digital signal (this signal is also denoted by $V_o$ for the sake of convenience of the explanation). In a block 101, the digital signal $V_o$ and the reference voltage $V_s$ are compared, to decide whether the $O_2$ sensor output $V_o$ is greater or smaller than the reference voltage $V_s$ corresponding to the theoretical air-fuel ratio. When $V_o \geq V_s$, it is indicated that the air-fuel ratio of the mixture is higher than the theoretical air-fuel ratio, in other words, that the mixture is rich. Conversely, when $V_o < V_s$, it is indicated that the air-fuel ratio of the mixture is lower than the theoretical air-fuel ratio, in other words, that the mixture is lean. When $V_o > V_s$, it is further decided in a block 102 whether the mixture has changed from "lean" to "rich" or it is maintaining the rich state. Where a change of the mixture from "lean" to "rich" has been detected, an arithmetic processing operation in which a signal corresponding to the proportional component $V_{pc}$ is subtracted from the control signal $V_d$ is executed in a block 104. On the other hand, if the mixture is maintaining the rich state, an arithmetic processing in which the integral component $\Delta V_I$ is subtracted from the control signal $V_d$ is executed in a block 105. Where it has been decided in the block 101 that $V_s > V_o$, it is subsequently decided in a block 103 whether the mixture has changed from "rich" to "lean" or it is maintaining the lean state. For a change from "rich" to "lean", a processing operation in which the proportional component $V_{pc}$ is added to the control signal $V_d$ is executed in a block 107. On the other hand, for maintenance of the lean state, a processing operation in which the integral component $\Delta V_I$ is added to the control signal $V_d$ is executed in a block 106. A signal subjected to the arithmetic processing operations as described above becomes a digital signal which corresponds to the waveform represented by FIG. 6C. In a block 108, a pulse whose duty ratio varies in correspondence with the digital signal is provided.

The above operations are the fundamental ones of the control system of this invention. In addition to them, the following operations are carried out in dependence on the running conditions of the automobile as well as the fluctuations thereof, etc.

(1) Control at the starting of the engine

Figure 8:
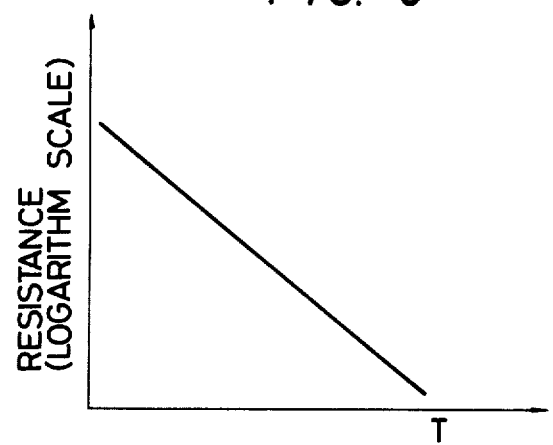
FIG. 8 is a graph showing the internal resistance—versus—temperature characteristic of the $O_2$ sensor.

Immediately after the starting of the engine, usually the temperature of the $O_2$ sensor 1 is low, and hence, a considerably high resistance is exhibited. FIG. 8 illustrates the temperature characteristic of the internal resistance of the O₂ sensor 1. The abscissa represents the temperature, while the ordinate represents the internal resistance of the O₂ sensor (on a logarithmic scale). The input impedance of the buffer amplifier 17 which amplifies the output of the O₂ sensor 1 is not sufficiently high as compared with the internal resistance of the O₂ sensor 1 at low temperatures. Accordingly, until the O₂ sensor 1 is warmed up, the output of the O₂ sensor 1 cannot be precisely amplified by the buffer amplifier 17. For this reason, in the embodiment shown in FIG. 2A, a signal from the control logic circuit 450 is supplied to the O₂ sensor 1 through the D/A converter 453, resistor 18 and diode 19 in order to sufficiently warm up the O₂ sensor 1 after the starting of the engine. Until the O₂ sensor 1 is sufficiently warmed up, pulse outputs which are fixed at a duty ratio of 50% are supplied to the solenoid valves 63 and 64.

Figure 9:
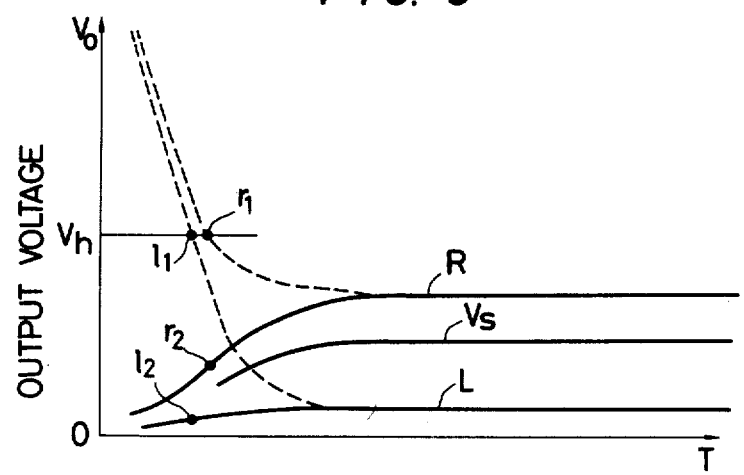
FIG. 9 is a graph showing the output voltage characteristic of the $O_2$ sensor.

Further, in the embodiment of this invention, the voltage level $V_s$ in FIG. 6B is varied depending upon the temperature of the O₂ sensor 1. The voltage level $V_s$ is a level which is previously set as a threshold value for deciding whether the air-fuel ratio of the mixture is greater or smaller than the theoretical air-fuel ratio, in other words, whether the mixture is rich or lean. When it is fixed, an inconvenience as stated below takes place. FIG. 9 illustrates the output voltage characteristic of the O₂ sensor 1. The abscissa represents the temperature of the O₂ sensor, while the ordinate represents the output voltage. In the graph, the solid line R indicates the output voltage at the time when the mixture is rich or has an air-fuel ratio greater than the theoretical air-fuel ratio, while the solid line L indicates the output voltage at the time when the mixture is lean or has an air-fuel ratio smaller than the theoretical air-fuel ratio. As seen from the graph, if the threshold level $V_s$ is kept constant, a case where the mixture should be rich might possibly be considered lean, or vice versa. In the embodiment of this invention, therefore, the voltage level $V_s$ is varied with the temperature of the O₂ sensor as indicated at $V_s$ in the graph so that the voltage level may be always set between the momentary maximum value and minimum value of the output of the O₂ sensor. Each dotted line in FIG. 9 indicates the output voltage of the O₂ sensor 1 obtained when a predetermined current is being supplied to the O₂ sensor in order to warm it up. As explained above, a fixed current is supplied from the control logic circuit 450 to the O₂ sensor 1 immediately after the starting of the engine. As the temperature rises gradually, the output voltage of the O₂ sensor 1 decreases. When the output voltage has become lower than a predetermined level $V_h$, the supply of current is stopped. Upon termination of the supply of current to sensor 1, the output voltage of the O₂ sensor 1 shifts from a point l₁ or r₁ on the dotted lines to a point l₂ or r₂ on the solid line. Since, at this time, the internal resistance of the O₂ sensor 1 is sufficiently low, the output thereof can be satisfactorily amplified by the buffer amplifier 17. Thereafter, the output voltage of the O₂ sensor 1 increases with the temperature rise as illustrated by the solid line. Since, however, also the threshold level $V_s$ varies as shown in the graph, the decision of "rich" or "lean" of the mixture can be accurately made. Here, before the output of the O₂ sensor shifts from l₁ or r₁ to l₂ or r₂, the solenoid valves 63 and 64 are on-off-controlled at the duty ratio of 50%, and after the shift, they are controlled at the duty ratio which varies depending upon the output of the O₂ sensor.

Now, a flow chart of the program which is stored in the ROM 43 in advance in order to perform the operation as described above will be explained with reference to FIG. 10.

After the starting of the engine, a voltage $V_a$ is provided from the D/A converter 453 in a block 110. Subsequently, in a block 111, "1" is set at a flag bit FLG of a predetermined register (not shown) in the control logic circuit 450. This indicates that the O₂ sensor 1 is being warmed up. In a block 112, the digital signal with the output voltage of the O₂ sensor 1 subjected to A/D conversion by the A/D converter 452 is loaded. In a block 113, whether the flag bit FLG of the register is "1" or "0" is determined. If the flag bit FLG is "1", the O₂ sensor 1 is being warmed up, and hence, the operation is shifted to a block 114 in which the output $V_o$ of the O₂ sensor 1 and the predetermined threshold level $V_h$ indicated in FIG. 9 are compared. Where, as a result, the output $V_o$ of the O₂ sensor 1 is greater than the value $V_h$, the warm-up of the sensor 1 is not completed yet. Therefore, the operation is shifted to a block 124 in which the output pulses fixed at the duty ratio of 50% are supplied to the solenoid valves 63 and 64. Unless the output $V_o$ of the O₂ sensor 1 is greater than the threshold level $V_h$, the output $V_a$ of the D/A converter 453 is made zero in a block 115 as illustrated in FIG. 10. As a consequence, the warm-up of the O₂ sensor 1 is stopped. Further, in a block 116, the flag bit FLG is cleared thereby to indicate the termination of the warm-up. In a block 117 the theshold level is altered from $V_h$ to $V_{so}$ experimentally obtained beforehand, whereupon the operation jumps to the block 112. If the flag bit FLG is "0" in the block 113, the warm-up of the O₂ sensor 1 has terminated, and hence, the operation shifts to a block 118. In blocks 118 and 119, it is respectively determined if the maximum value $V_{max}$ and the minimum value $V_{min}$ of the output of the O₂ sensor 1 are set in predetermined registers (not shown) of the control logic circuit 450. If both are set, the operation is shifted to a block 120. In the block 120, the threshold level $V_s$ is determined by the following arithmetic processing:

$$V_s = k \times (V_{max} - V_{min}) + V_{min} \tag{1}$$

where $0 < k < 1$. The output voltage $V_o$ of the O₂ sensor fluctuates due to a secular change, and the temporal change can be determined to some extent from the value of $(V_{max} - V_{min})$. By appropriately selecting the value of k, accordingly, the temporal change of the O₂ sensor can be corrected.

Unless $V_{max}$ and $V_{min}$ are set, the threshold level $V_{so}$ determined in the block 117 is used. In a block 121, the output $V_o$ of the O₂ sensor 1 and the threshold level $V_s$ are compared. When $V_o > V_s$, the maximum value $V_{max}$ of the output $V_o$ is set in the aforecited register (block 122), and when $V_o < V_s$, the minimum value $V_{min}$ of the output $V_o$ is set. The operations of the subsequent blocks 125, 126, 127, 128, 129, 130 and 131 are identical to those of the foregoing blocks 102, 105, 104, 103, 106, 107 and 108 in FIG. 7, respectively.

As described above, control can be effected even when the O₂ sensor 1 is not perfectly warmed up. In addition, a decision on whether the mixture is rich or lean can be properly made even when the output of the O₂ sensor 1 fluctuates due to the temporal change or the temperature change.

(2) Control dependent upon the load state of the engine and running conditions As stated previously, in the control system of this invention, the solenoid valves 63 and 64 are controlled by the pulse signal $V_p$ whose duty ratio varies in correspondence with the level of the control signal $V_d$ illustrated in FIG. 6C. The proportional component $V_{pc}$ and the integral component $\Delta V_I$ in the control signal $V_d$ have a great influence on the responsiveness of the control system. In order to attain a quick response, $V_{pc}$ and $\Delta V_I$ may be made large. In that case, however, the oscillation of the change of the air-fuel ratio becomes large, and there is an adverse effect which may cause hunting of the engine. In the embodiment of this invention, therefore, the load state is detected, and $V_{pc}$ and $\Delta V_I$ are determined in correspondence with the load.

Figure 11A:
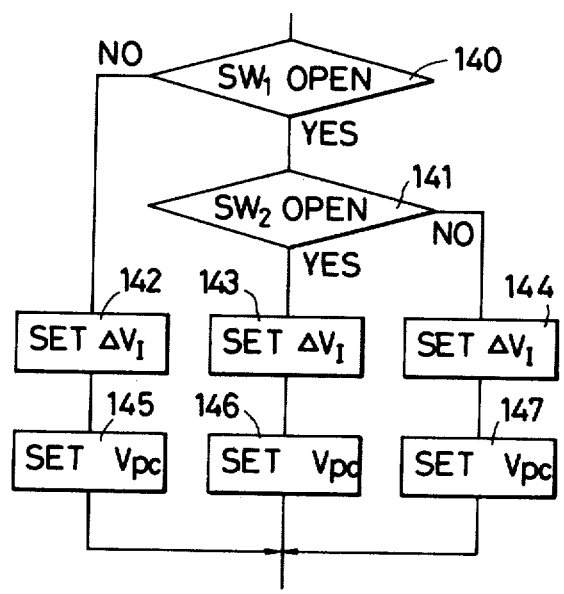

FIG. 11A shows a flow chart of a program for making the control which corresponds to the load state. In a block 140, it is decided whether the switch $SW_1$ for detecting the opening degree of the throttle valve 10 is open. As seen from FIG. 4, the case where the switch $SW_1$ is closed indicates that the opening degree of the throttle valve 10 is at most 9°. The automobile is accordingly deemed to be in the idling or the deceleration running. In this case, in blocks 142 and 145, the integral component $\Delta V_I$ and the proportional component $V_{pc}$ which correspond to the light load of the engine are calculated, and the duty ratio which is determined on the basis of them is set in the register 458 in FIG. 2B. On the other hand, where the switch $SW_1$ is open, the operation proceeds to a block 141, in which it is determined if the other switch $SW_2$ is open. As understood from FIG. 4, the case where the switch $SW_2$ is open indicates that the opening degree of the throttle valve 10 lies in the range of 9°-60°. Accordingly, the automobile is in the ordinary running state or a state of somewhat accelerating running. In blocks 143 and 146, $\Delta V_I$ and $V_{pc}$ corresponding to the running state are calculated, and data based on them is set in the register 458. Further, the case where the switch $SW_1$ is closed indicates that the opening degree of the throttle valve 10 is at least 60° and that the automobile is operated in the rapid acceleration state or under a high load. In blocks 144 and 147, accordingly, $\Delta V_I$ and $V_{pc}$ corresponding to the load are set. The proportional component $V_{pc}$ and the integral component $\Delta V_I$ which are to be set according to the magnitude of the load are usually evaluated experimentally.

As described above, the load state of the engine is detected, and the proportional component and the integral component of the control signal are selected accordingly. Therefore, the duty ratio of the pulses which are supplied to the solenoid valves 63 and 64 fits the state of the engine.

In the example shown in FIG. 11A, the load state of the engine is estimated from the opening degree of the throttle valve, and the duty ratio of the control pulse is varied. When the duty ratio of the control pulse is varied in consideration of other running conditions, for example, the engine revolution number and the cooling water temperature, the control precision can be more enhanced.

Referring to FIG. 11B, in a block 191, information on the running conditions of the engine, the cooling water temperature, the opening degree of the throttle valve, the negative pressure of the suction pipe, the revolution number of the engine, etc. are loaded from the sensors 2, 3, 12, 15, etc. into the control logic circuit 450. Subsequently, in a block 192, the proportional component $V_{pc}$ and the integral component $\Delta V_I$ which are experimentally determined with these running conditions taken into account are computed. $\Delta \tau_{on}$ denotes the variation of the "on" period of the duty ratio corresponding to the integral component $\Delta V_I$. Subsequently, in a block 193, it is determined from the output signal of the $O_2$ sensor 1 whether the control is now being made so as to render the mixture rich or lean. Where, as the result of the decision, the control tends to be "rich", a calculation in which $\Delta \tau_{on}$ is subtracted from the data set in the duty register 458 in FIG. 2B is executed by blocks 195 and 196, and the result is set in the register 458 again in a block 197. As a consequence, the "on" duty ratio to be supplied to the solenoid valves 63 and 64 decreases, and the supply fuel ratio increases by a component corresponding to $\Delta \tau_{on}$, so that the mixture is controlled to become rich. On the other hand, where the control tends to be "lean", a value with $\Delta \tau_{on}$ added to the content of the register 458 is set in the register 458 again.

Although the correction on the proportional component $V_{pc}$ is not illustrated in the flow chart, it may be carried out in such a way that the proportional component to be determined in dependence on the running conditions is calculated and subtracted from the content of the register 458 when the output of the $O_2$ sensor 1 has been inverted.

As described above, a mixture of the most suitable air-fuel ratio can be supplied to the engine under various running conditions of the engine.

(3) Correction of the response characteristic of the $O_2$ sensor

Since the output voltage of the $O_2$ sensor 1 varies depending upon the air-fuel ratio, as explained above, whether the mixture is rich or lean can be determined from this output voltage. In general, however, the response characteristic of the $O_2$ sensor differs between the case where the mixture changes from "rich" to "lean" and the case where it changes from "lean" to "rich". Ordinarily, the output response of the $O_2$ sensor in the case where the mixture changes from "lean" to "rich" is quicker than in the inverse case. Accordingly, even where the point of the sudden change of the output voltage of the $O_2$ sensor is in agreement with the theoretical air-fuel ratio in the static output characteristic of the $O_2$ sensor illustrated in FIG. 3, the alternate repetition of "lean" and "rich" around the theoretical air-fuel ratio results in the offset of the mean value of the controlled air-fuel ratios onto the lean side because, dynamically, the period of time during which the rich signal is provided is longer than the period of time during which the lean signal is provided. In order to correct this offset, the threshold level $V_s$ to be compared may be changed at the rise and fall of the output signal $V_o$ without resorting to the measure wherein whether the output signal $V_o$ from the $O_2$ sensor 1 is greater or smaller than the fixed threshold level $V_s$ is determined as illustrated in FIG. 6B and wherein the control signal $V_d$ as shown in FIG. 6C is generated.

Figure 12:
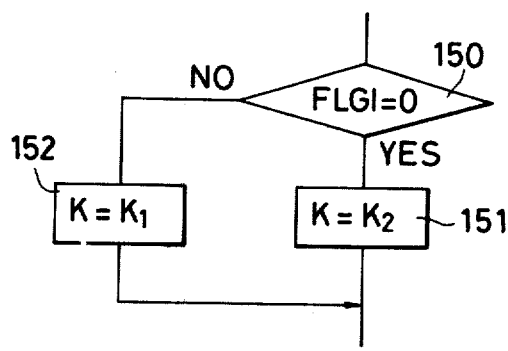
FIG. 12 is a flow chart for explaining the correction control of the response characteristic of the $O_2$ sensor.

FIG. 12 shows a flow chart for performing the above operation. The flow shown in this figure is inserted between the blocks 119 and 120 in FIG. 10. Where, in the block 121 in FIG. 10, the output voltage $V_o$ of the $O_2$ sensor is greater than the threshold level $V_s$, the mixture is considered to be rich, and where it is smaller, the mixture is considered to be lean. Where the mixture has been determined to be rich, the flag bit FLG1 of a predetermined register (not shown) of the control logic circuit 450 is set at "1", and where it has been determined to be lean, the flag bit is set at "0". In a block 150 in FIG. 12, whether the flag bit FLG1 is "1" or "0" is determined. Where FLG1=0, i.e., the mixture is lean, $k=k_2$ is established in a block 151. Where the mixture is rich, $k=k_1$ is established in a block 152. In the block 120 in FIG. 10, accordingly, the coefficients $k_2$ and $k_1$ which differ between the case of the lean mixture and the case of the rich mixture are employed. Therefore, the two threshold values $V_{s1}$ and $V_{s2}$ which have respectively different levels are obtained.

In this way, the output voltage of the $O_2$ sensor 1 is compared with the threshold levels differing at the rise and fall times, whereby the response characteristic of the $O_2$ sensor can be corrected.

(4) Control during rapid acceleration or rapid deceleration

Figure 13:
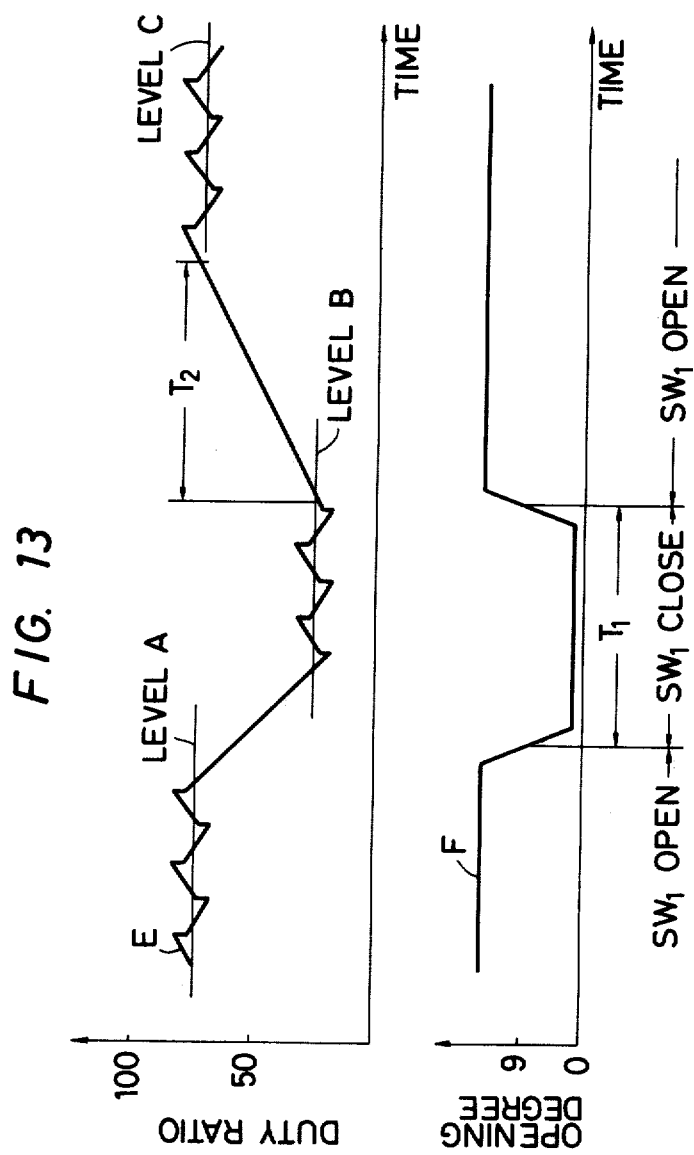
FIGS. 13 and 14 are a waveform diagram and a flow chart, respectively, for explaining the controls at rapid acceleration and at rapid deceleration.

In the control system of this invention, the control of the air-fuel ratio is made in response to the on-off output from the $O_2$ sensor 1, and hence, the responsiveness during the rapid acceleration or deceleration becomes a problem. The carburetor has the disadvantage that the quantity of air and the quantity of fuel cannot change in the same proportion during the rapid acceleration or deceleration. As a consequence, the air-fuel ratio of the mixture changes suddenly. In the PI (proportional-+integral) control, however, it takes a considerable time to follow up the variation of the air-fuel ratio changing rapidly. It is feared that the air-fuel ratio will deviate greatly from the desired value during the time. During such rapid acceleration or deceleration, accordingly, the air-fuel ratio needs to be corrected in accordance with an expected variation. In the embodiment of this invention, the rapid acceleration or deceleration is sensed by the switch $SW_1$ for detecting the opening degree of the throttle valve 10, and the control signal $V_p$ for controlling the air-fuel ratio is corrected. FIG. 13 shows the variation of the duty ratio of the control signal corresponding to the variation of the opening degree of the throttle valve 10. Letter F indicates the variation of the opening degree of the throttle valve. The switch $SW_1$ operates so as to open when the opening degree is at most 9°, and to close when it has become greater than 9°. Levels A, B and C indicate average levels of the duty ratio of the control pulse varying in correspondence with the opening degree of the throttle valve, respectively. When the switch $SW_1$ has changed from "open" to "closed", the average level of the duty ratio smoothly shifts from A to B. When the switch $SW_1$ has changed from "closed" to "open", the average level shifts from B to C. Here, the levels A, B and C change depending upon the state of the engine and do not become fixed values. It is, accordingly, difficult to anticipate the levels. However, for example, the case of the shift from the level B to the level C corresponds the acceleration and requires a quick response. In the embodiment of this invention, therefore, when the switch $SW_1$ changes from "open" to "closed", the immediately preceding average level A of the duty ratio is stored, and when the switch $SW_1$ has subsequently changed from "closed" to "open", the duty ratio is forcibly fixed to a value corresponding to the level A for a predetermined time T. However, where the closure time of the switch $SW_1$ is a predetermined time $T_1$ or longer, it is determined that the running state of the engine is idling or the like, and the usual control is made even when the switch $SW_1$ has changed from "closed" to "open" again.

Figure 14:
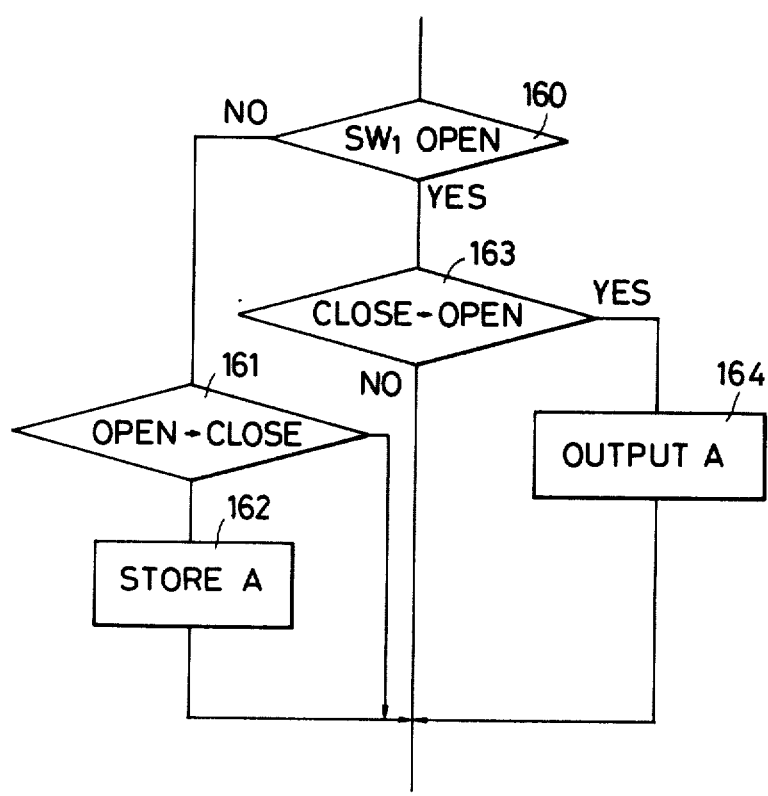

A flow chart of a program which is stored in the ROM 43 in advance in order to execute the operation as above described is shown in FIG. 14. In a block 160, whether the switch $SW_1$ is open or closed is determined. If it closes, it is subsequently determined in a block 161 whether the switch $SW_1$ has shifted from "open" to "closed". If the result is YES, the value of the level A is stored in the RAM 42 in a block 162. On the other hand, if the result is NO, the operation proceeds to the next step without any processing operation. Where, as a result of the decision of the block 160, the switch $SW_1$ is open, the operation proceeds to a block 163 in which it is determined if the switch $SW_1$ has shifted from "closed" to "open". If the result is YES, the control pulse which has the duty ratio of the level A having previously stored before is applied to the solenoid valves 63 and 64 in a block 164. This processing operation, however, is executed only where the closure time of the switch $SW_1$ is not longer than $T_2$. On the other hand, if the result of the decision of the block 163 is NO, the operation proceeds to the next step without any processing operation. The processing operations illustrated in FIG. 14 are inserted between the blocks 113 and 114 of the flow chart in FIG. 10.

In the way as described above, according to the embodiment of this invention, the air-fuel ratio of the mixture can be quickly brought into the desired value even at the rapid acceleration or deceleration.

(5) Control for defects in the $O_2$ sensor etc.

Where, as in the control system of this invention, the air-fuel ratio of the mixture of the carburetor 5 is controlled in response to the output of the $O_2$ sensor 1, control becomes impossible when the $O_2$ sensor and the carburetor malfunction. In such a case, when the uncontrollable situation continues, the air-fuel ratio becomes abnormal, and the function of cleansing the exhaust gas is degraded. It is, therefore, necessary to immediately issue an alarm to the driver with a lamp or the like. To this end, in the embodiment of this invention, the fault is detected with the output signal of the $O_2$ sensor 1 and by detecting whether or not the signal period representative of the rich or lean state of the mixture continues for at least a predetermined period of time. As shown in FIG. 6B, the period of the output of the $O_2$ sensor 1 is not always constant.

It is therefore desirable that the predetermined time to be compared is not fixed but that it is made variable in correspondence with, for example, the "on" or "off" states of the switches $SW_1$ and $SW_2$ which operate in response to the opening degree of the throttle valve 10. On the other hand, the periods of the lean signal and rich signal of the output of the $O_2$ sensor 1 can be sensed from the flag bit FLG1.

Figure 15:
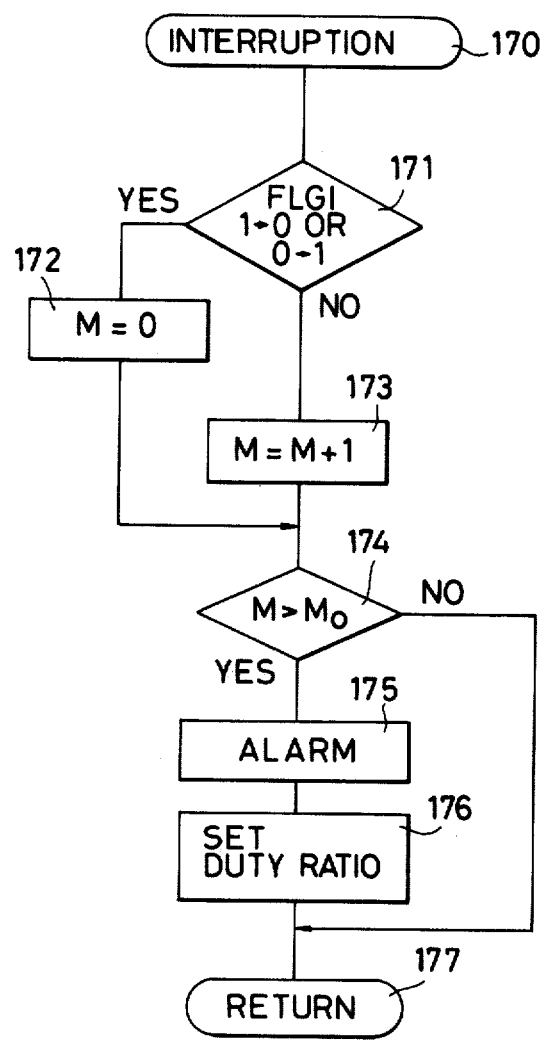
Figure 16:
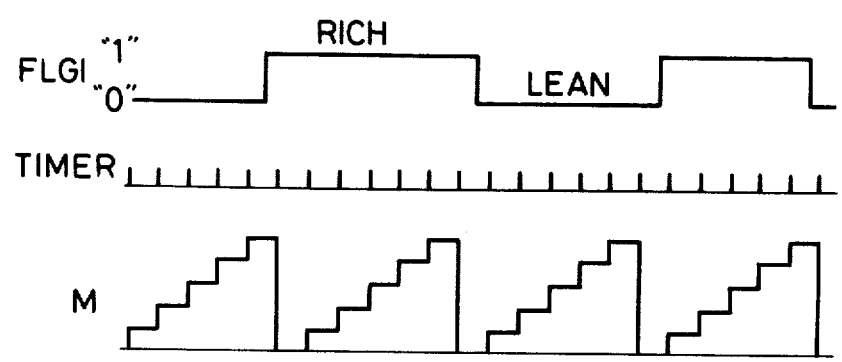

FIG. 15 shows a flow chart of a program for executing this operation, and FIG. 16 shows timings of the signals.

In a block 170 in FIG. 15, an interrupt is applied to the MPU 41 periodically by the use of the signal from the timer. As indicated in FIG. 16, the flag bit FLG1 assumes the state of "1" representing that the mixture is rich and the state of "0" representing that the mixture is lean. In a block 171, it is decided if the flag bit FLG1 has changed from "1" to "0" or from "0" to "1". In case of the change, a predetermined memory area M of the RAM 42 is cleared in a block 172. On the other hand, where the decision of the block 171 is NO, a block 173 is shifted, and the content of the memory area M is increased one by one in synchronism with the signal of the timer 161. As a result, a value corresponding to the period in which the flag bit FLG1 is "1" or "0" is counted as the content of the memory area M. As illustrated at M in FIG. 16, the count value does not exceed a certain value while the flag bit FLG1 is normally repeating "1" or "0". However, where the flag bit FLG1 has continued in the state of "0" or "1" for a long period of time, the content of the memory area M continues to increase and results in exceeding the predetermined value $M_o$. In a block 175, an alarm is issued when $M > M_o$ has been established. Further, in a block 176, the duty ratio of the control pulse to be applied to the solenoid valves 63 and 64 is set at 50%. On the other hand, unless $M > M_o$ in a block 174, the interrupt processing operation is ended upon the determination that the $O_2$ sensor and the carburetor etc. are normally operating.

As described above, according to the embodiment of this invention, the fault of the control system can be simply detected by the software counter system.

(6) Open loop control of the air-fuel ratio

Figure 17A:
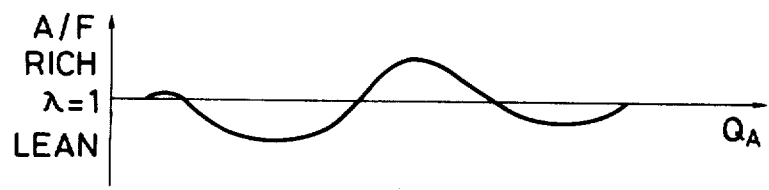

Usually, the air-fuel ratio of the mixture which is generated by the carburetor varies as illustrated in FIG. 17A when the quantity of suction air $Q_A$ changes on account of, for example, the fabrication error of the Venturi portion or an inferior adjustment of the coupling portion between the main channel and the slow channel. Therefore, in inspecting the carburetor, an offset in the supply air-fuel ratio versus the quantity of inflow air is measured, and this value is stored in the ROM 44. Using the stored data, the characteristic of the carburetor can be corrected. More specifically, during the operation of the engine, the information of the revolution number and load state of the engine at that time are loaded, and the quantity of suction air $Q_A$ is calculated from the information. The data (A/F) stored in the ROM 44 are referred to in correspondence with the quantity of suction air. Thus, how large the deviation of the supply air-fuel ratio of the carburetor from the reference value is can be known. Accordingly, the slow channel or the main channel is controlled so as to correct the deviation component, whereby the mixture which has the fixed air-fuel ratio versus the quantity of suction air can be supplied at all times. By performing such control, the air-fuel ratio can be held constant without employing the $O_2$ sensor.

Figure 18:
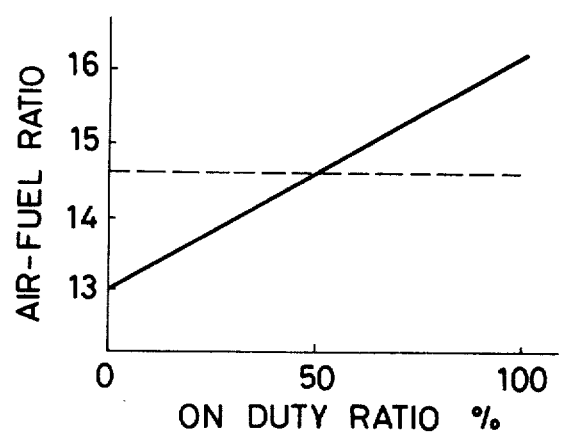
FIG. 18 is a graph showing the relationship between the air-fuel ratio and the "on" duty ratio of a control pulse.
Figure 17C:
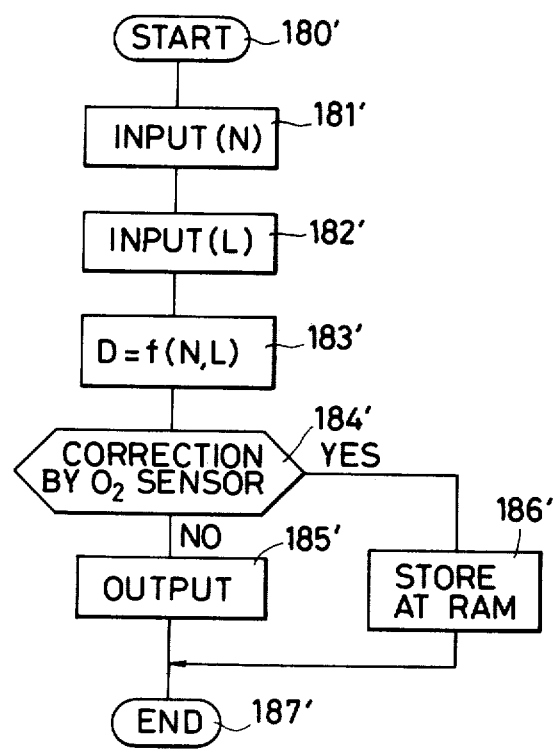
FIGS. 17B and 17C are flow charts each elucidating the open loop control of the air-fuel ratio.
Figure 17B:
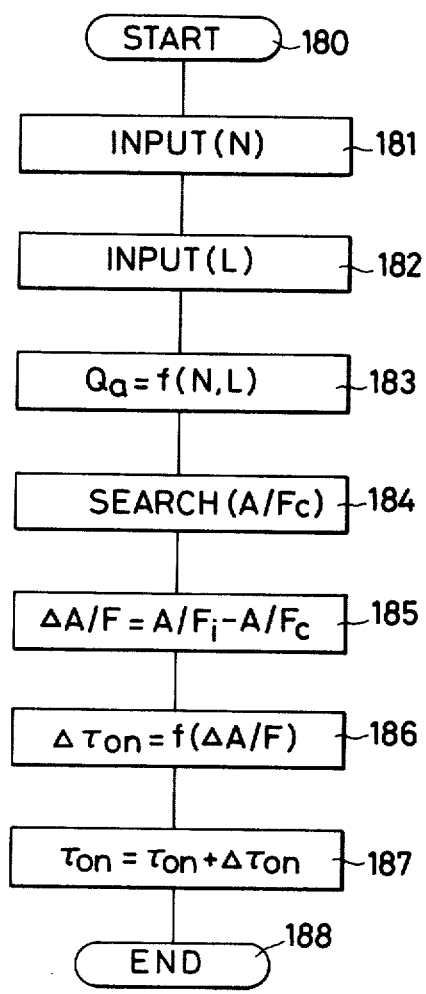

FIG. 17B shows a flow chart of a program for executing the above control. In a block 181, the number of the output pulses $P_1$ of the rotational angle sensor 15 as are generated within a predetermined time is counted. The number of pulses becomes information representative of the revolution number N of the engine. Subsequently, in a block 182, a signal representative of the negative pressure of the suction pipe as sensed by the pressure sensor 12 is loaded into the I/O unit 45. That is, the multiplexer 451 is instructed to load the output signal of the pressure sensor 12. The detection signal of the pressure sensor 12 is subjected to the A/D conversion, and then stored in a register (not shown) of the control logic circuit 450. The content of this register is thereafter stored in the RAM 42. Subsequently, in a block 183, the quantity of inflow air $Q_a$ is computed from the information of the revolution number N of the engine and the pressure L of the suction pipe by a known method. Further, in a block 184, the information of the supply air-fuel ratio of the carburetor corresponding to the quantity of suction air $Q_a$ is obtained by retrieval of the ROM 44. Further, in a block 185, the difference $\Delta A/F$ between the reference air-fuel ratio $A/F_i$ corresponding to the quantity of inflow air and the aforecited air-fuel ratio $A/F_c$ of the carburetor is computed. In a block 186, the variation $\Delta \tau_{on}$ of the "on" period of the duty ratio of the control pulse corresponding to the difference $\Delta A/F$ is computed. In a block 187, the variation $\Delta \tau_{on}$ is added to the data representative of the "on" period $\tau_{on}$ as set in the register 458 in FIG. 2B, and the result is set in the register 458 anew. The air-fuel ratio of the mixture to develop from the carburetor varies as shown in FIG. 18 in dependence on the "on" duty ratio of the control pulse which is supplied to the solenoid valves 63 and 64. Accordingly, by correcting the offset of the supply air-fuel ratio of the carburetor relative to the reference air-fuel ratio at a proper timing, the mixture having the fixed air-fuel ratio in the entire running region can be supplied to the engine even when the supply air-fuel ratio has the characteristic as shown in FIG. 17A on account of a fabrication error in the carburetor.

In the above, the data for making the air-fuel ratio constant versus the quantity of suction air $Q_A$ may well be stored in the ROM 44. The stored data is, for example, the "on" duty ratio of the solenoid driving pulse corresponding to the engine revolution number N and the suction negative pressure L. As indicated in FIG. 18, the "on" duty ratio corresponds to the air-fuel ratio A/F. Naturally, the stored data makes the air-fuel ratio of the supply mixture constant over the entire running region of the engine. Accordingly, the control of the constant air-fuel ratio is possible in such a way that the "on" duty ratio (D) of the driving pulse is evaluated from the revolution number N and the negative suction pressure L in a block 183' in FIG. 17C, and that the data D is set in the duty register in a block 185'. In a block 184', if the correction by the $O_2$ sensor (to be described below) is being conducted is determined. In case of YES, the data D needs to be temporarily stored in the RAM 42.

(7) Correction by the $O_2$ sensor in the control (6)

It is very effective, as described above, that, in order to make the air-fuel ratio of the supply mixture of the carburetor constant, irrespective of the variation of the quantity of suction air $Q_A$, data as shown in FIG. 17A are stored in the ROM as to the respective carburetors. However, when actuators (jets, slow and main solenoids of the carburetor, etc.) have undergone temporal changes, the actual air-fuel ratio of the supply mixture deviates from the ideal value, and the rich or lean state is maintained for a long period of time. In order to eliminate this disadvantage, the temporal changes may be corrected with the output of the $O_2$ sensor simultaneously with the open loop control as explained in item (6). The control program in the case of making corrections by the $O_2$ sensor is substantially the same as in FIG. 7, and a detailed description is omitted.

(8) Control of the choke function

By electrically controlling the choke function with which the carburetor is endowed, improvements in the starting and warming-up characteristics of the engine can be achieved. To this end, in the embodiment of the present invention, the signal from the starting switch 14, the signal from the throttle sensor 3, etc. are loaded into the I/O unit 45. Using a control signal formed on the basis of the signals, the solenoid valve 20 is controlled which regulates the air flow rate of the bypass passage for bypassing the quantity of inflow air into the suction manifold.

Figure 19:
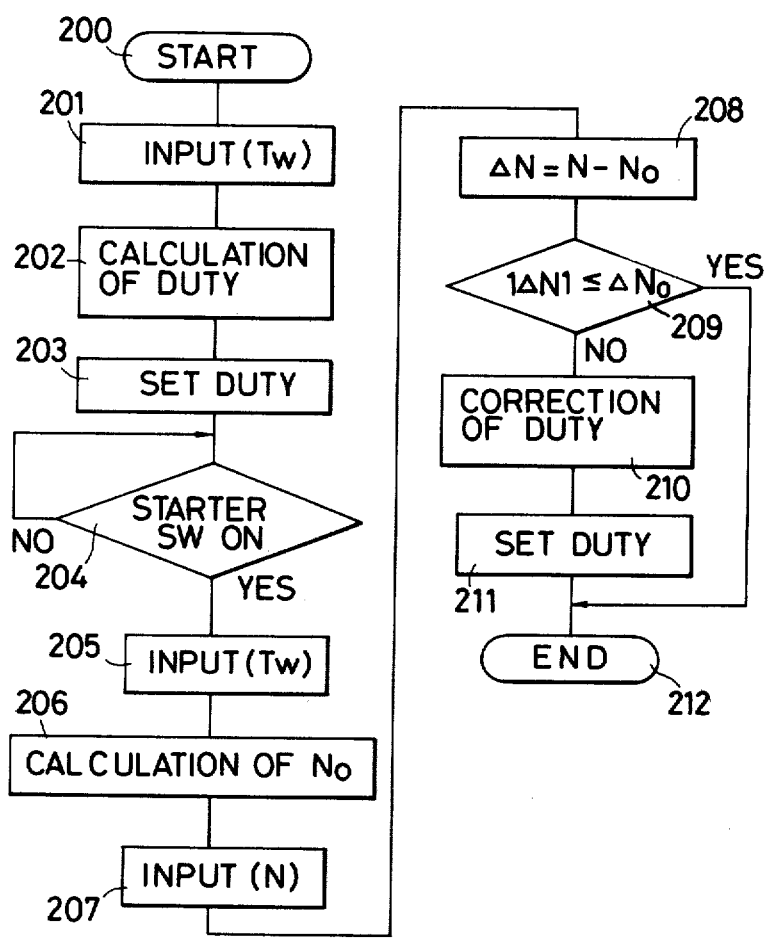
FIG. 19 is a flow chart for explaining the control of a choke function.

FIG. 19 shows a flow chart of a program which is employed for the control. In a block 201, the temperature of the cooling water before the starting of the engine is detected by the sensor 2, and it is loaded into the register of the control logic circuit 450 through the multiplexor 451 and the A/D converter 452. Subsequently, in a block 202, the "on" duty ratio of the pulse to be supplied to the control solenoid 20 is calculated so as to permit the passage of a bypass air quantity which is previously determined in correspondence with this water temperature. In a block 203, the calculated result is set in an air bypassing duty register (not shown) which is disposed in order to determine the duty ratio of the control pulse of the solenoid valve 20. In a block 204, whether the starter switch 14 is "on" or "off" is determined. When the starter switch 14 has turned "on" to establish the cranking state, the quantity of air to flow into the suction manifold is limited in dependence on the water temperature, and hence, the solenoid 20 is controlled so that the mixture to be fed from the carburetor may become richer as the water temperature is lower. After the completion of the starting, the idling state is detected with the signal from the throttle valve opening-sensor 3. Thereafter, in a block 205, the temperature information of the cooling water is loaded again. Further, in a block 206, the desired value $N_o$ of the idle revolution number corresponding to the loaded water temperature is calculated. The relationship between the water temperature and the desired value of the idle revolution number is experimentally determined in advance, and is stored in the ROM 43 or 44. In a block 207 the revolution number information N of the engine at the present time is loaded from the sensor 15, and in a block 208 the difference $\Delta N$ from the desired value is calculated. In a block 209, it is decided if this difference is greater than a predetermined value $\Delta N_o$. If $|\Delta N| \leq \Delta N_o$, the "on" duty ratio of the pulse to be supplied to the control solenoid 20 for the quantity of bypass air need not be corrected. On the other hand, in case where $|\Delta N| > \Delta N_o$, the "on" duty ratio of the control pulse corresponding to $\Delta N$ is calculated in a block 210, and the new duty ratio determined on the basis of the calculation is set in the air bypassing duty register in a block 211.

The program above stated is repeatedly started at suitable time intervals until the termination of the operation of the engine, where the opening degree of the throttle valve is not greater than a predetermined value after the starting of the engine.

Therefore, the idle revolution number is always set at the desired value corresponding to the temperature of the cooling water. In this regard, when data are stored in advance so as to raise the idle revolution number at low temperatures, it is possible to finish the warming-up in a very short time and to automatically lower the revolution number as the warming-up advances. It is accordingly possible to save fuel which is uselessly consumed for the warming-up.

(9) Controls of EGR and IGN

According to the embodiment of this invention, the feedback control or open loop control of the air-fuel ratio of the mixture becomes possible, and the engine can be comprehensively controlled with the exhaust gas recirculation control (EGR) and the ignition timing control (IGN) included.

The EGR circulation rate is indicated by:

$$\text{Circulation rate} = \frac{\text{Quantity of exhaust circulation}}{\text{Quantity of suction air}} \times 100\%$$

Accordingly, when a desired circulation rate is determined in order to suppress, for example, the quantity of emission of NO, the quantity of exhaust circulation can be evaluated by (circulation rate x quantity of suction air) from the above relational expression. On the other hand, the "on" duty ratio of the pulse to be impressed on the solenoid valve and the aforecited quantity of exhaust circulation have a fixed relationship. Accordingly, the quantity of suction air is calculated from the engine revolution number N and the negative suction pressure L, the quantity of exhaust circulation is obtained by the product between the result and the predetermined circulation rate, and the pulse which has the "on" duty ratio corresponding to the quantity of circulation is supplied to the EGR solenoid valve 21, whereby the EGR control corresponding to the running conditions can be made.

Figure 20:
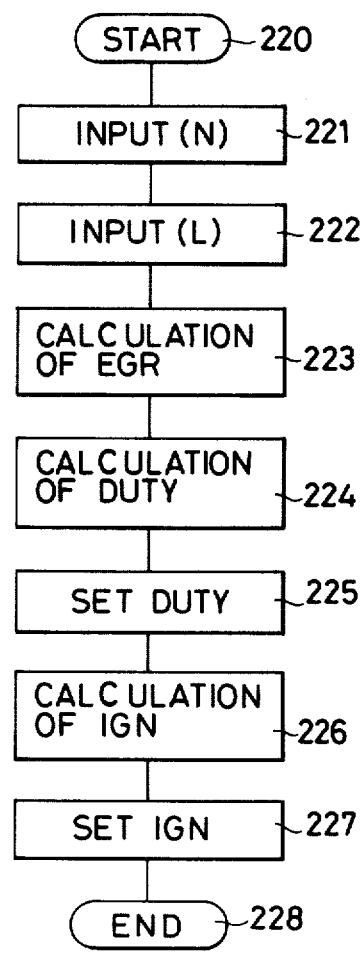
FIG. 20 is a flow chart for explaining the control of an EGR as well as an IGN.

Referring to FIG. 20, in a block 221, information indicative of the engine revolution number N is loaded from the sensor 15. In a block 222, information indicative of the negative suction pressure of the suction pipe is loaded from the pressure sensor 12. Further, in a block 223, the desired quantity of exhaust circulation is evaluated from the predetermined circulation rate and the information N and L, and in a block 224, the duty ratio of the control pulse corresponding thereto is evaluated. The relationship between the quantity of exhaust gas circulation and the duty ratio is experimentally determined in advance, and the data are stored in the ROM 44. The data representative of the evaluated duty ratio is set in a duty register for EGR (not shown) which is disposed in the control logic circuit 450. The control pulse whose "on" duty ratio has been evaluated in correspondence with the supply air-fuel ratio and the engine revolution number as above described is supplied to the EGR solenoid 21. As is known, this solenoid 21 is used for circulating part of the exhaust gas into the suction manifold. As a result, the unburnt gas can be appropriately recirculated, so that the clarification of the exhaust gas can be enhanced.

On the other hand, the ignition timing can be determined by the air-fuel ratio, the EGR circulation rate and the density of the mixture. Since these values have already been obtained, the optimum ignition timing is calculated with them in a block 226. Data representative of the ignition timing is set in a register which is disposed in the control logic circuit 450 and which is to be described later. The ignition coil 22 is supplied with an ignition pulse which is controlled on the basis of the set data. As a consequence, the control of the ignition timing is made jointly with the control of the air-fuel ratio of the suction mixture of the engine. It can contribute to the enhancement of the transient response and the reduction of the fuel consumption.

Figure 21:
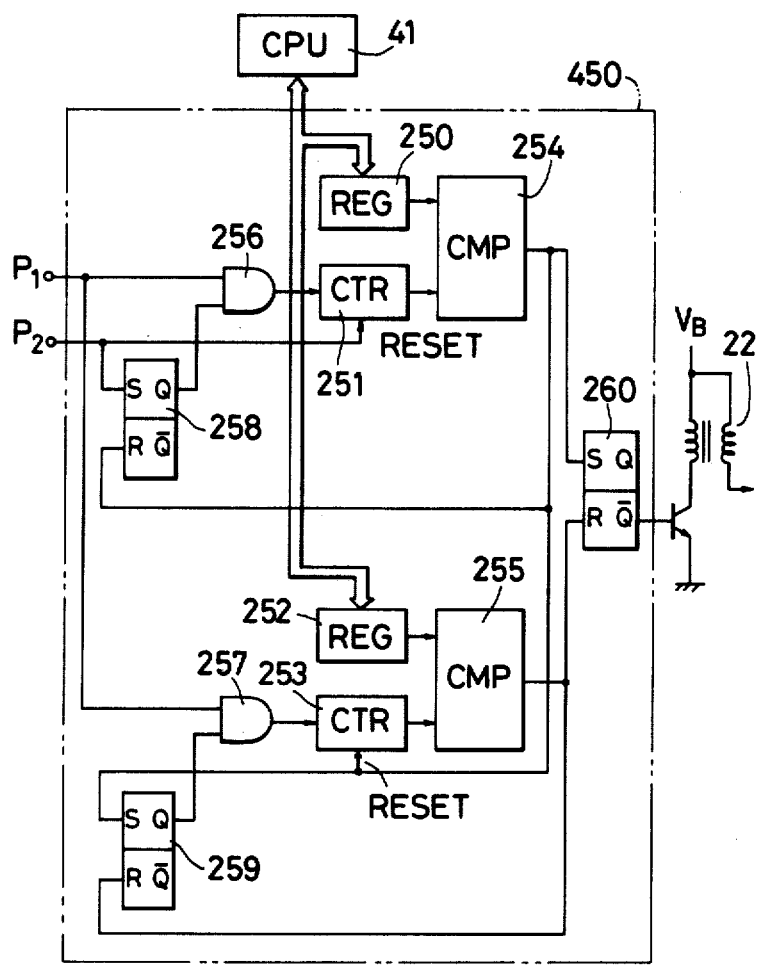
FIG. 21 is a block diagram showing the arrangement of a logic control circuit for use in the IGN control.
Figure 22:
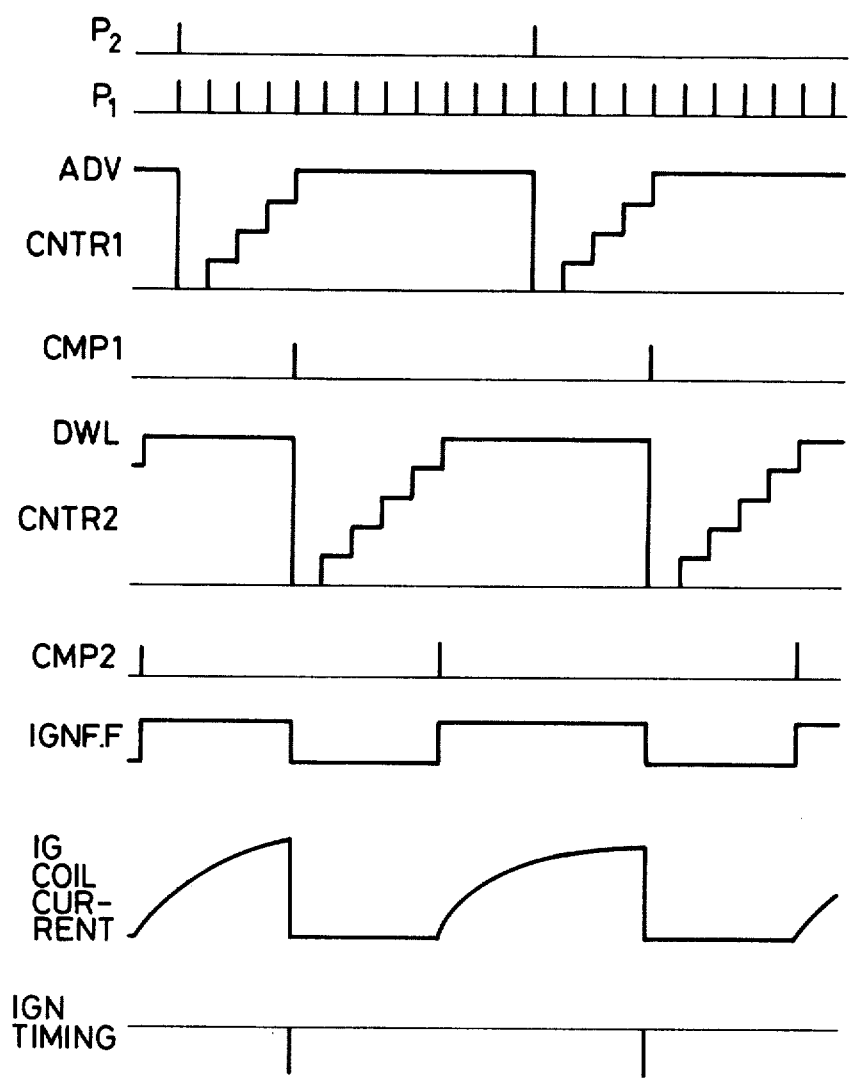
FIG. 22 is a waveform diagram for explaining the operation of the circuit in FIG. 21.

FIG. 21 shows the arrangement of the logic control circuit 450 for the ignition timing control, while FIG. 22 shows waveform diagrams at various parts of the circuit. The logic control circuit 450 shown in FIG. 21 is mainly composed of registers 250 and 252, counters 251 and 253 and comparators 254 and 255. Data ADV for determining the ignition timing is given from the MPU 41 to the register 250 in advance. On the other hand, data DWL representative of a timing for beginning to supply current to the ignition coil 22 is set from the MPU 41 into the register 252 in advance. A pulse $P_1$ generated by the sensor 15 is impressed on the counter 251 through an AND gate 256. This counter is reset by a pulse $P_2$. Consequently, the count value of the counter 251 varies as indicated at CNTR1 in FIG. 22. When the value CNTR1 has reached the value ADV set in the register 250, the comparator 254 provides an output CMP1. The signal CMP1 is applied to a flip-flop 258 to disable the AND gate 256, so that the pulses $P_1$ after the generation of the signal CMP1 are not applied to the counter 251. On the other hand, a flip-flop 259 is set by the signal CMP1 to enable an AND gate 257, with the result that the pulses $P_1$ pass through the AND gate 257 to enter the counter 253. Therefore, the count value of the counter 253 varies as indicated at CNTR2 in FIG. 22. When this value has reached the set value DWL in the register 252, an output signal CMP2 is provided from the comparator 255. The flip-flop 259 is reset by the signal CMP2, and the gate 257 is disabled. Since a flip-flop 260 is set by the signal CMP1 and reset by the signal CMP2, a signal indicated at IGNFF in FIG. 22 is delivered. Accordingly, a current as shown in FIG. 22 flows through the ignition coil 22, and the point of time corresponding to the fall of the current becomes the ignition timing. In this way, the ignition timing can be arbitrarily controlled by the data set in the registers 250 and 252.

While the embodiments of this invention have been described above, the invention can be arbitrarily altered within a scope not departing from the essential spirit thereof.

We claim:

1. A processor-based control apparatus for controlling the supply of fuel to an internal combustion engine comprising:
   regulation means for controlling the air-fuel ratio of a mixture of fuel and air to be supplied to said engine in response to a control signal applied thereto;
   first sensor means for producing a detection signal representative of the oxygen concentration in exhaust gas emitted from said engine; and
   a control unit, responsive to said detection signal produced by said first sensor means, for generating said control signal to be supplied to said regulation means, whereby said air-fuel ratio is controlled, said control unit comprising a processor unit and an input/output unit,
   said input/output unit comprising
      a register in which is stored data supplied by said processor unit representative of the duty cycle of said control signal,
      timing means for counting clock pulses supplied thereto and generating an output indicative of the count, and
      comparator means for comparing the count output of said timing means with the data stored in said register and producing said control signal in accordance with a prescribed relationship between the count output of said timing means and said stored data, and
   said processor unit is coupled to receive said detection signal and performs the following functions:
      (a) evaluating the maximum value and the minimum value of the detected signal capable of being produced by said first sensor means,
      (b) generating a signal representative of a threshold level $V_s$ intermediate said evaluated maximum and minimum values, in response to step (a), and
      (c) comparing said threshold level $V_s$ representative signal with said detected signal and generating data representative of said duty cycle in accordance with a predetermined relationship between said threshold level $V_s$ representative signal and said detected signal.

2. A processor-based control apparatus for controlling the supply of fuel to an internal combustion engine comprising:
   regulation means for controlling the air-fuel ratio of a mixture of fuel and air to be supplied to said engine in response to a control signal applied thereto;
   first sensor means for producing a detection signal representative of the oxygen concentration in exhaust gas emitted from said engine;
   a control unit, responsive to said detection signal produced by said first sensor means, for generating said control signal to be supplied to said regulation means, whereby said air-fuel ratio is controlled, said control unit comprising a processor unit and an input/output unit; and
   a current coupling path which couples current from said control unit to said first sensor means in order to control the response characteristics of said first sensor means; and wherein
   said input/output unit includes means for converting the detection signal into digital format so as to be compatible with data signals handled by said processor unit, and means for converting a prescribed data signal generated by said processor unit into analog format for providing a control current to be coupled over said current coupling path to said first sensor means, and
   said processor unit is coupled to receive said detection signal and performs the following functions:
      (a) evaluating the maximum value and the minimum value of the detected signal capable of being produced by said first sensor means,
      (b) generating a signal representative of a threshold level $V_s$ intermediate said evaluated maximum and minimum values, in response to step (a), and
      (c) comparing said threshold level $V_s$ representative signal with said detected signal and generating data representative of said duty cycle in accordance with a predetermined relationship between said threshold level $V_s$ representative signal and said detected signal.

3. A processor-based control apparatus according to claim 2, wherein said processor unit further performs the following functions:
   (d) comparing said detection signal with a predetermined threshold level, and
   (e) generating said prescribed data signal, by way of which said control current is provided, for that period of time during which the level of said detection signal exceeds said predetermined threshold level.

4. A processor-based control apparatus according to claim 3, wherein said processor unit further performs the following functions:
   (f) causing the duty cycle of said control signal to have a predetermined value for said period of time during which the level of said detection signal exceeds said predetermined threshold level.

5. A processor-based control apparatus according to one of claims 1 or 2, further including second sensor means for detecting the degree of opening of a throttle valve provided in said engine and producing an output signal representative thereof, and wherein said processor unit further performs the following functions:
- (d) in response to said output signal representative of the degree of opening of said throttle valve, generating proportional component representative data corresponding to a preselected step change in the duty cycle of said central signal and integral component representative data corresponding to a preselected rate of change of the duty cycle of said control signal, and
- (e) adjusting said data representative of said duty cycle in accordance with step (d), whereby the duty cycle of said control signal applied to said regulation means is controlled in accordance with proportional and integral components dependent upon the degree of opening of said throttle valve corresponding to the state of operation of the engine.

6. A processor-based control apparatus according to one of claims 1 or 2,
wherein said detection signal has a first prescribed state associated with a first prescribed oxygen concentration in exhaust gas, corresponding to a first prescribed range of said air-fuel ratio, and a second prescribed state associated with a second prescribed oxygen concentration in exhaust gas, corresponding to a second prescribed range of said air-fuel ratio, and
wherein said processor unit further performs the function (b) by:
- (b1) generating a first preselected reference signal representative of a first threshold level $V_{s1}$ in response to said detection signal changing from its first prescribed state to its second prescribed state, and
- (b2) generating a second preselected reference signal representative of a second threshold level $V_{s2}$ in response to said detection signal changing from its second prescribed state to its first prescribed state, and wherein said processor unit further carries out said step (c) by:
- (c1) in response to said detection signal changing from its first prescribed state to its second prescribed state, comparing said detected signal with said first threshold level $V_{s1}$ and generating data representative of said duty cycle in accordance with a predetermined relationship between said first threshold level $V_{s1}$ representative signal and said detected signal, and
- (c2) in response to said detection signal changing from its second prescribed state to its first prescribed state, comparing said detected signal with said second threshold level $V_{s2}$ and generating data representative of said duty cycle in accordance with a predetermined relationship between said second threshold level $V_{s2}$ representative signal and said detected signal.

7. A processor-based control apparatus according to one of claims 1 or 2, further including second sensor means for detecting the degree of opening of a throttle valve provided in said engine and producing an output signal representative thereof, and wherein said processor unit further performs the following function:
- (d) in response to said output signal representative of the degree of opening of said throttle valve indicating that the degree of opening of said throttle valve has changed between first and second prescribed ranges, storing data representative of the duty cycle of said control signal immediately prior to the change of the degree of opening of said throttle valve between said first and second prescribed ranges,
- (e) in response to said output signal representative of the degree of opening of said throttle valve, detecting whether or not the rotational speed of said engine is undergoing a rapid rate of change, and
- (f) setting the duty cycle of said control signal at the value corresponding to the data stored in step (d) for a predetermined period of time in response to detecting, in step (e), that the rotational speed of said engine is undergoing a rapid rate of change.

8. A processor-based control apparatus according to one of claims 1 or 2,
wherein said detection signal has a first prescribed state associated with a first prescribed oxygen concentration in exhaust gas, corresponding to a first prescribed range of said air-fuel ratio, and a second prescribed state associated with a second prescribed oxygen concentration in exhaust gas, corresponding to a second prescribed range of air-fuel ratio, and
wherein said processor unit further comprises
counter means, the contents of which are periodically changed during the respective prescribed states of said detection signal, and
wherein said processor unit further performs the function
- (d) causing the duty cycle of said control signal to be set at a fixed value in response to the degree of change of the contents of said counter means exceeding a predetermined limit over the duration of a respective one of said first and second prescribed states of said detection signal.

9. A processor-based control apparatus for controlling the supply of fuel to an internal combustion engine comprising:
regulation means for controlling the air-fuel ratio of a mixture of fuel and air to be supplied to said engine in response to a control signal applied thereto;
first sensor means for producing a first detection signal representative of the oxygen concentration in exhaust gas emitted by said engine;
second sensor means for generating pulses in accordance with the rotation of the engine crankshaft;
third sensor means for producing a second detection signal representative of the negative suction pressure of a suction pipe of an engine cylinder; and
a control unit, responsive to the pulses generated by said second sensor means and to the first and second detection signals produced by said first and third sensor means, for generating said control signal to be supplied to said regulation means, whereby the air-fuel ratio is controlled,
said control unit comprising
memory means for storing data representative of fluctuations in the air-fuel ratio versus quantity of suction air, and data representative of signals produced by said sensor means, and a processor unit coupled to said memory means, said processor performs the following functions:
  (a) generating, in response to pulses generated by said second sensor means and said second detection signal, first prescribed data representative of the quantity of suction air for said engine,
  (b) generating data representative of the duty cycle of said control signal associated with the air-fuel ratio determined in accordance with said first prescribed data,
  (e) evaluating the maximum value and the minimum value of said first detection signal capable of being produced by said first sensor means,
  (d) generating a signal representative of a threshold level $V_s$ intermediate said maximum and minimum values, in response to step (c), and
  (e) comparing said threshold level $V_s$ representative signal with said detected signal and generating data representative of a correction of said duty cycle-representative data generated in step (b) in accordance with a predetermined relationship between said threshold level $V_s$ representative signal and said detected signal.

10. A processor-based control apparatus according to claim 9,
  wherein said engine includes a control valve for controlling exhaust recirculation in accordance with an input signal applied thereto, and
  wherein said processor unit further performs the following functions:
    (f) generating second prescribed data representative of the quantity of exhaust recirculation in accordance with said first prescribed data and data representative of a predetermined exhaust recirculation rate, and
    (g) generating data representative of the duty cycle of said input signal to be applied to said control valve in accordance with said second prescribed data, and
  wherein said control unit includes means for coupling said input signal to said control valve.

11. A processor-based control apparatus according to claim 10,
  wherein said engine includes ignition means for causing the ignition of the air-fuel mixture in response to an ignition signal applied thereto, and
  wherein said processor unit further performs the following functions:
    (h) generating third prescribed data representative of the timing of said ignition signal in accordance with said first prescribed data, data representative of the exhaust recirculation rate and data representative of the air-fuel ratio, and
    (i) generating data representative of the duty cycle of said ignition signal in accordance with said third prescribed data, and
  wherein said control unit includes means for coupling said ignition signal to said ignition means.

* * * * *